(12) United States Patent
Li et al.

(10) Patent No.: US 8,506,655 B1
(45) Date of Patent: Aug. 13, 2013

(54) FLUORESCENT DYES CONTAINING PHOSPHORUS OR ARSENIC

(75) Inventors: Zaiguo Li, Little Neck, NY (US); Praveen Pande, Holbrook, NY (US)

(73) Assignee: Enzo Life Sciences, Inc., Farmingdale, NY (US)

( * ) Notice: Subject to any disclaimer, the term of this patent is extended or adjusted under 35 U.S.C. 154(b) by 0 days.

(21) Appl. No.: 13/565,323

(22) Filed: Aug. 2, 2012

(51) Int. Cl.
*D06L 3/04* (2006.01)

(52) U.S. Cl.
USPC .................................... 8/648; 8/622; 8/633

(58) Field of Classification Search
USPC ............................. 8/648, 622, 633
See application file for complete search history.

(56) References Cited

U.S. PATENT DOCUMENTS 7,799,926 B2 * 9/2010 Gall .............................. 548/102

OTHER PUBLICATIONS

STIC Search Report dated Mar. 15, 2013.*

* cited by examiner

*Primary Examiner* — Eisa Elhilo
(74) *Attorney, Agent, or Firm* — Anna DiGabriele Petti, Esq.

(57) ABSTRACT

The present invention provides a fluorescent dye that incorporates a pentavalent phosphorus or arsenic into its ring structure. Also provided is a fluorescence energy transfer system that comprises the above fluorescent dye and a second dye, where the second dye is capable of energy transfer with the fluorescent dye. Additionally provided is a kit for labeling a target molecule. In further embodiments, another kit for labeling a target molecule is provided. A target molecule labeled with the above-described fluorescent dye is also provided. In additional embodiments, methods of labeling a target molecule are provided.

20 Claims, 4 Drawing Sheets

THE SPECTRA WERE RECORDED IN METHANOL.
ABSORPTION (LEFT CURVE): $\lambda_{max}$=665 nm; EMISSION (RIGHT CURVE): $\lambda_{max}$=687 nm

FLUORESCENT DYES CONTAINING PHOSPHORUS OR ARSENIC

BACKGROUND OF THE INVENTION (1) Field of the Invention

The present application generally relates to fluorescent dyes. More specifically, the invention is directed to novel dyes useful for labeling nucleic acids and other molecules. These dyes contain a pentavalent phosphorus or arsenic atom in the ring system.

(2) Description of the Related Art

Numerous fluorescent dyes are available that are useful for labeling nucleic acids, proteins and other molecules. See, e.g., U.S. Pat. Nos. 6,184,379 and 6,552,199; European Patent Publications 0 543 333 and 0 567 622, and references cited therein.

There are a variety of properties that might be desirable for dyes that are intended for use as markers for detection of proteins or nucleic acids. These include the ability to bind to a protein, lipid or nucleic acid, the capability of incorporation into nucleic acids by enzymatic means when attached to a nucleotide, a lack of steric hindrance that could potentially interfere with nucleic acid hybridization, water solubility, lack of aggregation, ability to intercalate into double-stranded nucleic acids, and the presence of a reactive group that allows attachment of the dye to a nucleotide or other desirable target. Suitable dyes could have many of these properties but do not need to have them all. For instance, the ability to intercalate may allow detection of hybridization events in the presence of unhybridized probes or it may provide increased hybridization stabilization. Examples of these applications are disclosed in European Patent Publication EP 0 231 495 and U.S. Pat. Nos. 5,994,056 and 6,174,670. Similarly, the ability of a nucleotide labeled with the dye to be incorporated into a nucleic acid by an enzyme is a useful property when carrying out enzymatic labeling of nucleic acids. However, labels that are inhibitory towards incorporation can still be used in some methods where nucleic acids are chemically synthesized rather than using enzymatic means. Also, nucleotides with reactive groups such as allyl-amine may be incorporated enzymatically into nucleic acids and then in a second step they are post-synthetically modified by attachment of dyes. Steric hindrance may be compensated to some degree by utilizing a properly designed linker joining the dye to a nucleotide. For a discussion of this last point, see U.S. Patent Publication 2003/0225247.

The particular spectral characteristics of dyes are also important qualities. Although broad-spectrum white light can be used as a source of excitation, lasers with defined set wavelengths are most commonly employed. As such, dyes having most immediate use generally have excitation wavelengths at or near that of such standard laser wavelengths. Emission wavelengths are more flexible since filters can be used to isolate a particular part of the spectrum.

There are a number of machines available for detection of labeled nucleic acids that have been designed with dyes that are commonly used. For instance, there are several slide scanners that have been optimized for detection of nucleic acids labeled with the Cy3 and Cy5 dyes, as described in U.S. Pat. No. 5,268,486. However, the availability of dyes that have useful properties but have wavelengths that are not commonly used can be utilized by adopting lasers with compatible wavelengths.

A set of dyes with well separated emission spectra may be used simultaneously. Applications that utilize multiple dyes are immunostaining for various proteins in cells, in situ hybridization for multiple targets, non-radioactive sequencing, nucleic acid array analysis, protein array analysis, and non-specific cellular staining with dyes having general affinities for proteins or lipids. Overlapping spectral characteristics also have applications, for instance, emission by one fluorophore may be used to excite a second fluorophore through energy transfer when distances are sufficiently close.

Dyes that have been most widely used as markers for proteins and nucleic acid labeling include members of the xanthene, coumarin, cyanine and asymmetric cyanine dye families.

Xanthene dyes such as fluorescein are among the earliest dyes used for biological staining, where fluorescein was used to work out many of the techniques for labeling proteins and nucleic acids. The basic structure of fluorescein molecules is

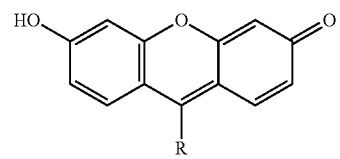

Related xanthene compounds that have also been used as labels include rhodols and rhodamines. Their basic structure is

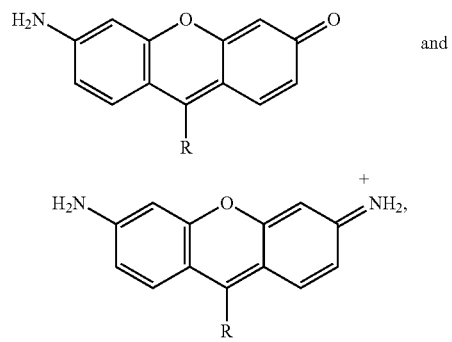

and respectively. The R group attached to the central structure is typically a substituted phenyl group although, as described in U.S. Patent Publication 2003/0225247, aphenylic versions are also suitable as dyes.

Another family of dyes that have widespread use are coumarin derivatives. The basic structure of coumarin is

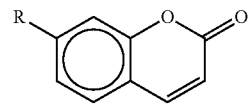

Typically, coumarin derivatives are dyes when R is an OH or an amine group. R may also be further modified such that enzymatic cleavage converts the R group into an OH or amine group. Such a proto-dye or dye precursor can be used as a marker for the presence of the enzyme that is capable of making the conversion. See, e.g., U.S. Pat. Nos. 5,696,157 and 5,830,912.

A large number of useful dyes are cyanines. The basic structure of cyanine dyes is

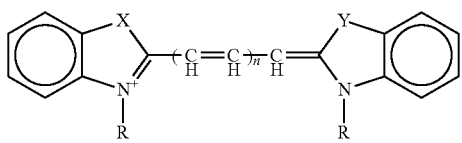

Major factors influencing the spectral qualities of these dyes is the number n, the nature of X and Y, and functional groups that extend the aromaticity of the dyes.

Other compounds that are functionally considered to be cyanine-type dyes are the merocyanine and styryl dyes, whose structures are:

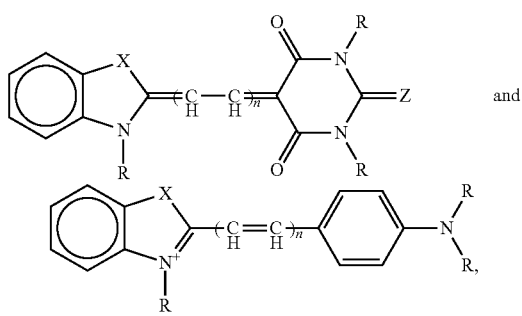

respectively. See, e.g., U.S. Pat. No. 5,268,486.

There are a variety of atoms that have been used in the X and Y positions in the above cyanine dyes. These include carbon, sulfur, oxygen, nitrogen and selenium. When X or Y is a carbon, this portion of the dye is an indolinium moiety. When X or Y is substituted by sulfur, oxygen or nitrogen this portion is known as a benzothiazolium, benzoxazolium or a benzimidazolium moiety, respectively.

Another version of styryl dyes can have picoline or quinoline moieties instead of the benzazolium group, thereby having the structures:

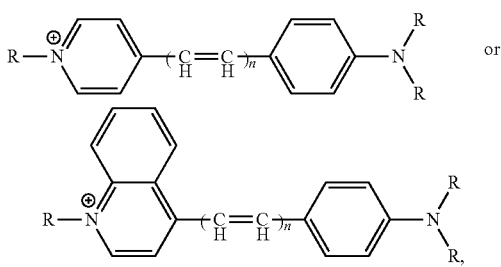

respectively.

Asymmetric cyanine dyes contain one portion that is essentially the benzazolium portion of the cyanine dye family with a different aromatic compound connected to the benzazolium moiety by the methine bridge. Their structure is:

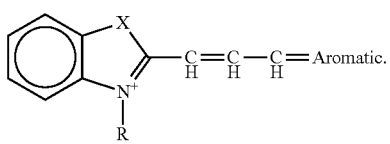

The aromatic moiety is generally a six membered aromatic or heteroaromatic ring.

Improvements to the various dyes described above have been made by substituting various groups onto the basic structure, e.g., on a carbon or nitrogen of the preceding structures or where H or R groups are featured. Additionally, other rings may be fused to various parts of the rings in the structures above, thereby generating more complex structures. These modifications have led to shifts in the excitation and emission characteristics of the dyes, such that there are now a large number of dyes with same basic structure but with different spectral characteristics. As described above, the cyanine dyes can have a general structure comprising two benzazolium-based rings connected by a series of conjugated double bonds. The dyes are classified by the number (n) of central double bonds connecting the two ring structures; monocarbocyanine or trimethinecarbocyanine when n=1; dicarbocyanine or pentamethinecarbocyanine when n=2; and tricarbocyanine or heptamethinecarbocyanine when n=3. The spectral characteristics of the cyanine dyes follow specific empirical rules. For example, each additional conjugated double bond between the rings usually raises the absorption and emission maximum about 100 nm. Thus, when a compound with n=1 has a maximum absorption of approximately 550 nm, equivalent compounds with n=2 and n=3 can have maximum absorptions of 650 nm and 750 nm respectively. Addition of aromatic groups to the sides of the molecules has lesser effects and may shift the absorption by 15 nm to a longer wavelength. Groups comprising an indolenine ring can also contribute to the absorption and emission characteristics. Using the values obtained with gem-dimethyl group as a reference point, oxygen substituted in the ring for the gem-dimethyl group can decrease the absorption and emission maxima by approximately 50 nm. In contrast, substitution of sulfur can increase the absorption and emission maxima by about 25 nm. R groups on the aromatic rings such as alkyl, alkyl-sulfonate and alkyl-carboxylate usually have little effect on the absorption and emission maxima of the cyanine dyes (see, e.g., U.S. Pat. No. 6,110,630).

As discussed above, alteration of spectral qualities is only one useful modification that can be made to a dye. In another aspect, modification of a dye by addition of a sulfonate group may increase the stability of many dyes and thereby resist "bleaching" after illumination. Additionally, modification of cyanine dyes by sulfonation decreases aggregation of target molecules labeled with those dyes (see, e.g., U.S. Pat. No. 5,569,766). Such modifications were also applied to xanthenes, coumarins and the non-benzazolium portion of asymmetric cyanine dyes (see, e.g., U.S. Pat. Nos. 5,436,134, 6,130,101 and 5,696,157). Modifications of dyes haves also been made to increase their affinity or selectivity towards binding to nucleic acids (see, e.g., European Patent Publication EP 0 231 495, U.S. Patent Publication 2003/0225247 and U.S. Pat. No. 5,658,751).

The utility of many of these dyes has been enhanced by synthesis of compounds with a reactive group that allows attachment of the dye to a target molecule. For instance, although cyanine dyes in themselves had been known for many years, it was only when derivatives were described with reactive groups (see, e.g., U.S. Pat. No. 5,268,486) that they found widespread use in labeling proteins and nucleic acids. Their versatility was then increased further by disclosure of other groups that could be used to attach cyanine dyes to suitable partners (see, e.g., U.S. Pat. No. 6,114,350 and U.S. Patent Publication 2003/0225247). An exemplary list of electrophilic groups and corresponding nucleophilic groups that can be used for these purposes are given in Table 1 of U.S. Pat. No. 6,348,596.

A variety of linker arms may be used to attach dyes to targets. Commonly used constituents for linkers are chains that contain varying amounts of carbon, nitrogen, oxygen and sulfur. Examples of linkers using some of these combinations are given in U.S. Pat. No. 4,707,440. Bonds joining together the constituents can be simple carbon-carbon bonds or they may be acyl bonds (see, e.g., U.S. Pat. No. 5,047,519), sulfonamide moieties (see, e.g., U.S. Pat. No. 6,448,008) and polar groups (see, e.g., U.S. Patent Publication 2003/0225247).

Because fluorescent dyes are used widely, e.g., for labeling nucleic acids, proteins and other molecules, there is an ongoing need for new dyes to provide more options for labeling methods and linker arm selections, spectral profiles and energy transfer (FRET) pair selection. The present invention addresses that need.

BRIEF SUMMARY OF THE INVENTION

The present invention provides fluorescent dyes that incorporate phosphorus or arsenic into its ring structure. Thus, in some embodiments, a fluorescent dye is provided. The dye comprises Structure I, II, III or IV:

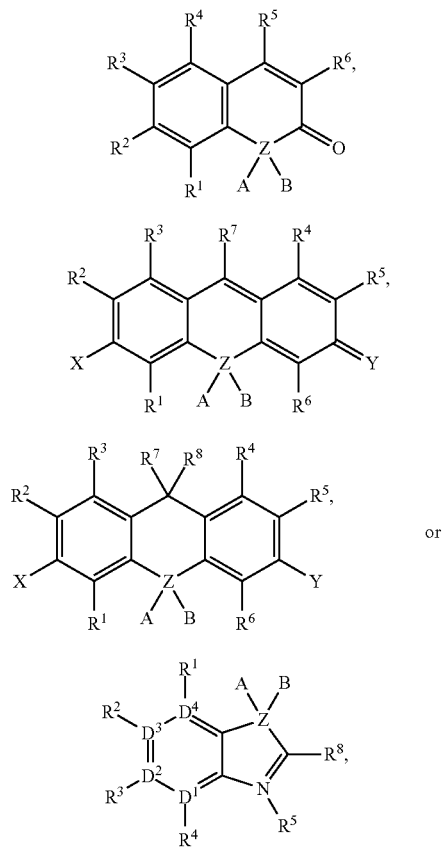

wherein $R^1$, $R^2$, $R^3$, $R^4$, $R^5$, $R^6$, $R^7$ and $R^8$ are independently H, F, Cl, Br, I, CN, nitro, azido, hydroxyl, amino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl(aryl)aminocarbonyl, arylcarboxamido, or Q, the alkyl or alkoxy portions of which are saturated or unsaturated, linear or branched, and unsubstituted or substituted; wherein Q comprises a carboxyl group ($CO_2^-$), a carbonyl halide, a carbonate ester or thioester ($COSR^9$) or amide ($COER^9$), a thiocarboxylic acid, a thiocarbonyl halide, a thiocarbonate ester or amide ($CSER^9$), a sulfonate acid or halide or ester ($SO_2ER^9$), a sulfoxide ($SOR^9$), a sulfone ($SO_2CR^9R^{10}R^{11}$), a sulfonamide ($SO_2NR^9R^{10}$), a phosphate ($PO_4^=$), a phosphoryl halide, a phosphate monoester or monoamide ($PO_3^-ER^9$), a phosphate diester or diamide ($PO_2ER^9ER^{10}$), a phosphonate ($PO_3^=$), a phosphonyl halide, a phosphonate monoester or monoamide ($PO_2^-ER^9$), a phosphonate diester or diamide ($POER^9ER^{10}$), a thiophosphate ($PSO_3^=$), a thiophosphate monoester or monoamide ($PSO_2^-ER^9$), a thiophosphate diester or diamide ($PSOER^9ER^{10}$), a thiophosphonate ($PSO_2^=$), a thiophosphonyl halide, a thiophosphonate monoester or monoamide ($PSO^-ER^9$), a thiophosphonate diester or diamide ($PSER^9ER^{10}$), a phosphonamide ($PONR^9R^{10}NR^{12}R^{13}$), a phosphonamide thioanalogue ($PSNR^9R^{10}NR^{12}R^{13}$), a phosphoramide ($PONR^9R^{10}NR^{11}NR^{12}R^{13}$), a phosphoramide thioanalogue ($PSNR^9R^{10}NR^{11}NR^{12}R^{13}$), a phosphoramidite ($PO_2R^{12}NR^9R^{10}$) or a phosphoramidite thioanalogue ($POSR^{12}NR^9R^{10}$, where each E is independently N, NH, O or S;

$R^1$ in combination with $R^2$, $R^2$ in combination with $R^3$, $R^3$ in combination with $R^4$, $R^3$ in combination with $R^7$, $R^4$ in combination with $R^7$, or $R^4$ in combination with $R^5$ can independently form a 5-10 member ring structure which is saturated, unsaturated or aromatic, unsubstituted or comprising a heteroatom, and/or further substituted;

$R^9$, $R^{10}$, $R^{11}$, $R^{12}$ and $R^{13}$ are independently a hydrogen, a halogen, an amino group, an alkyl group wherein said alkyl group is saturated or unsaturated, linear or branched, or substituted or unsubstituted, an alkoxy group wherein said alkoxy group is saturated or unsaturated, branched or linear, or substituted or unsubstituted, an aryl group wherein said aryl group is unsubstituted or substituted; wherein $R^9$ in combination with $R^{10}$, $R^{12}$ in combination with $R^{13}$, $R^9$ in combination with $R^{11}$, $R^9$ in combination with $R^{12}$, $R^{10}$ in combination with $R^{13}$, or $R^{11}$ in combination with $R^{12}$ can independently form a 5-10 member ring;

X is O, $OR^{14}$, S, $SR^{15}$, $CR^{16}R^{17}$, $NR^{16}R^{17}$ or $N^+R^{16}R^{17}$; Y is O, $OR^{14}$, S, $SR^{15}$, $CR^{18}R^{19}$, $NR^{18}R^{19}$ or $N^+R^{18}R^{19}$, wherein $R^{14}$, $R^{15}$, $R^{16}$, $R^{17}$, $R^{18}$ and $R^{19}$ are independently H, alkyl, aryl, alkylcarbonyl, arylcarbonyl, or Q, in which the alkyl or aryl potions are unsubstituted or substituted, saturated or unsaturated, or $R^{16}$ in combination with $R^{17}$, or $R^{18}$ in combination with $R^{19}$ can independently form an unsubstituted or substituted 5-10 member ring structure, and $R^{16}$ in combination with $R^1$, $R^{17}$ in combination with $R^2$, $R^{18}$ in combination with $R^5$, or $R^{19}$ in combination with $R^6$, can independently form a 5- to 10-member ring structure that is saturated or unsaturated and substituted or unsubstituted;

Z is a pentavalent P or As;

A and B are substituents that link to Z through single or double bonds and are independently H, O, S, NH, F, Cl, Br, I, CN, nitro, azido, hydroxyl, amino, imino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl(aryl)aminocarbonyl, arylcarboxamido, or Q, the alkyl or alkoxy portions of which are saturated or unsaturated, linear or branched, and substituted or unsubstituted;

A in combination with B, A in combination with a ring formed by $R^1$ and $R^2$, B in combination with a ring formed by $R^4$ and $R^5$ of structures I or II, A in combination with $R^1$, B in combination with $R^6$, A in combination with $R^6$, or B in combination with $R^7$, can independently form a 5- to 10-member ring structure that is saturated or unsaturated, and unsubstituted or substituted; and $D^1$, $D^2$, $D^3$ and $D^4$ are either C or N, wherein only 1 or none of $D^1$, $D^2$, $D^3$ or $D^4$ are N.

Also provided is a fluorescence energy transfer system. The fluorescence energy transfer system comprises the above fluorescent dye and a second dye, wherein the second dye is capable of energy transfer with the fluorescent dye.

Additionally provided is a kit for labeling a target molecule. The kit comprises the above fluorescent dye with additional reagents useful for labeling the target molecule.

In further embodiments, another kit for labeling a target molecule is provided. This kit comprises a first fluorescent dye and a second fluorescent dye that form an energy transfer pair, wherein the first fluorescent dye is the fluorescent dye described above.

Also, a target molecule labeled with the above-described fluorescent dye is provided.

In additional embodiments, methods of labeling a target molecule are provided. These methods comprise contacting the fluorescent dye above, which further comprises a reactive group or a member of a binding pair, with a target molecule that can react with the reactive group or with the member of the binding pair to bind the dye to the target molecule.

DETAILED DESCRIPTION OF THE INVENTION

Figure 1:
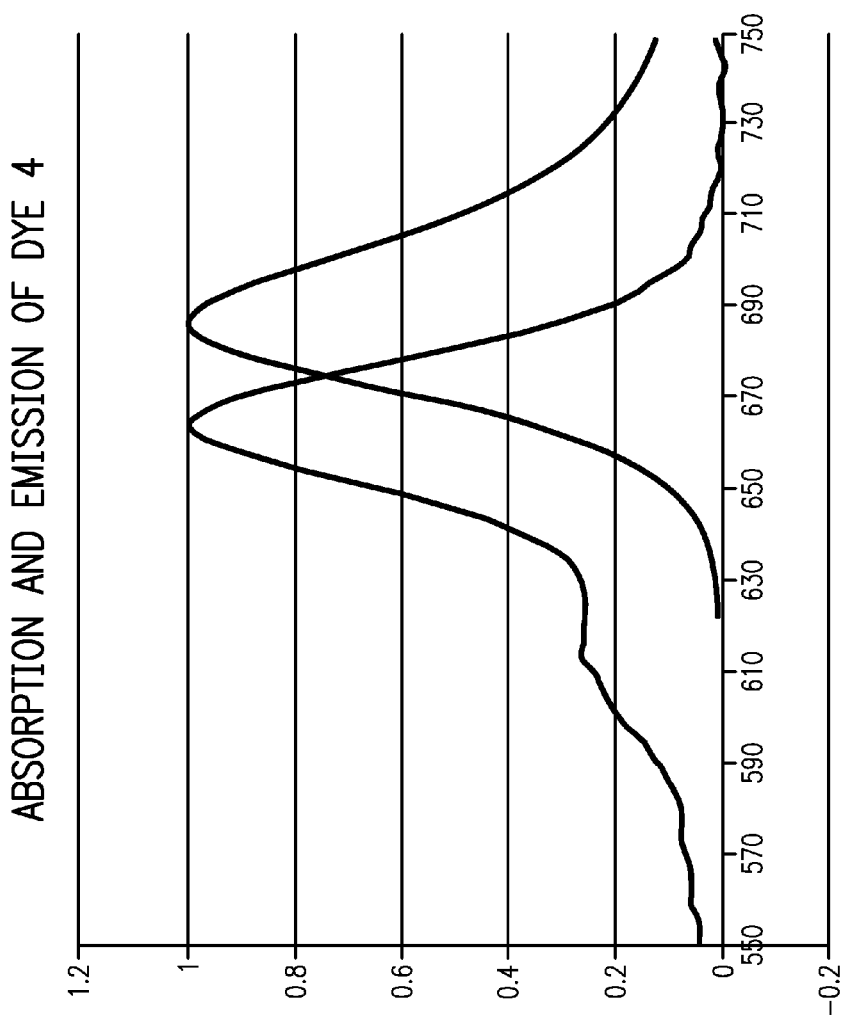
FIG. 1 is a graph showing spectral properties of Dye 4. The absorption and emission spectra of dye 4 were recorded in methanol, with excitation wavelength of 614 nm for emission spectrum.

For labeling, diagnosis and imaging purposes, far red dyes and near-infrared (NIR) dyes have recently attracted attention. In various applications, far red and NIR dyes provide the opportunity for multiplexing with blue, green, yellow or other red dyes. In imaging applications, far red and NIR dyes make it possible for in vivo deep imaging because NIR light can travel deeper in the tissue than light of shorter wavelength due to lower background and attenuation. NIR light also causes less tissue damage than light of shorter wavelength. Since xanthene dyes are an important class of fluorescent dyes with high extinction coefficients, high quantum yield and excellent photo-stability, numerous efforts have been made to shift the emission wavelength of xanthene dyes to far red or NIR regions. Replacing the oxygen atom in the ring system of xanthene dyes with quaternary (saturated) carbon or silicon atoms provides a significant red shift in the absorption and emission wavelengths of the dyes. For xanthene dye derivatives with quaternary (saturated) carbon replacing the oxygen atom, see references U.S. Pat. No. 6,828,159, U.S. Patent Application 2011/0190486, WO 00/64986, WO 03/007296, and WO 2005/003086. For xanthene dye derivatives with quaternary silicon atom replacing an oxygen atom, see Chinese patent CN100361999; WO 2010/126077; Koide et al., 2011; McCann et al., 2011; Koide et al., 2012; and Egawa et al., 2011. Without being bound to any particular mechanism, it is believed that the red shifts of the absorption and emission wavelengths of these derivatives is caused by two effects: 1) a quaternary carbon or silicon atom alters the whole conjugation system facilitated by an oxygen atom; and 2) replacing the oxygen atom with a quaternary carbon or silicon atom eliminates the electron donating effect of the oxygen atom provided through participation with the lone electron pair of the conjugation system. Based on these two effects, it is believed that a slightly electron withdrawing group that interrupts the conjugation system of fluorescent dyes causes a red shift. A phosphonate or arsenate group is suitable for this purpose because (a) they are rather weak electron withdrawing groups, (b) they do not participate in the conjugation system, and (c) they provide good water solubility and biological compatibility. Thus, provided here are novel dye derivatives containing a phosphonate or arsenate group, or related groups, in the ring structure, in positions where an oxygen atom is present in conventional dyes. These novel dyes possess longer wavelength properties and excellent water solubility compared to analogous conventional dyes or their carbon or silicon analogs.

Substitutions within the center ring position of anthracene leads to well-known families such as acridines, having a nitrogen substitution, and xanthenes, having an oxygen substitution. Phosphorus and arsenic substitutions are also known, which can be viewed as anthracene, acridine or xanthene analogs. Accordingly, these analogs are sometimes referred to as acridophosphines and acridoarsinines Examples of compounds of this nature are described in references cited below. One point in common with most of the structures described therein is that the P and As moieties are primarily in the trivalent form; few compounds have the P or As in the pentavalent form. In addition, the acridophosphines and acridoarsinines generally lack the presence of a double bond in the center ring that allows it to participate in an extended conjugation system. In the present invention, the acridophosphines and acridoarsinines have the appropriate aromatic ring structure for an extended ring system that allows for their use as fluorescent dyes. Furthermore the pentavalency of the P or As allows the presence of =O and —O⁻ (or —OH) on the P or As, providing a phosphonate or arsenate moiety, thereby increasing the hydrophilic character of the dyes. Since the analogous previously known dyes have a generally hydrophobic character due to their aromatic nature, the increased hydrophilic character can advantageously result in increased water solubility of the dyes, a characteristic that is extremely useful when the dyes are attached to proteins or nucleic acids.

Other dyes having a phosphonate group are described in Bello et al. (2000) for dying fabrics. See, e.g., U.S. Pat. No. 7,569,695 for a discussion of structures of known conventional dyes, where the novel dyes of this invention provide a phosphonate, arsenate or related groups as a replacement for the oxygen in the heterocyclic ring structure of those dyes.

Thus, in some embodiments, a fluorescent dye is provided. The dye comprises Structure I, II, III or IV:

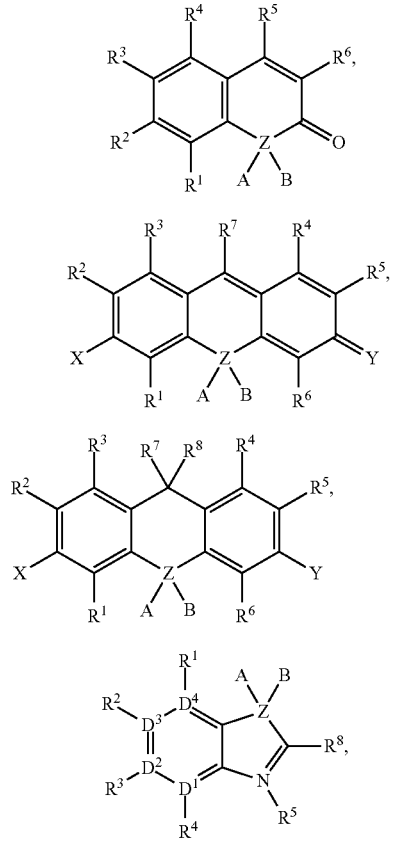

wherein $R^1$, $R^2$, $R^3$, $R^4$, $R^5$, $R^6$, $R^7$ and $R^8$ are independently H, F, Cl, Br, I, CN, nitro, azido, hydroxyl, amino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl(aryl)aminocarbonyl, arylcarboxamido, or Q, the alkyl or alkoxy portions of which are saturated or unsaturated, linear or branched, and unsubstituted or substituted; wherein Q comprises a carboxyl group ($CO_2^-$), a carbonyl halide, a carbonate ester or thioester ($COSR^9$) or amide ($COER^9$), a thiocarboxylic acid, a thiocarbonyl halide, a thiocarbonate ester or amide ($CSER^9$), a sulfonate acid or halide or ester ($SO_2ER^9$), a sulfoxide ($SOR^9$), a sulfone ($SO_2CR^9R^{10}R^{11}$), a sulfonamide ($SO_2NR^9R^{10}$), a phosphate ($PO_4^-$), a phosphoryl halide, a phosphate monoester or monoamide ($PO_3^-ER^9$), a phosphate diester or diamide ($PO_2ER^9ER^{10}$), a phosphonate ($PO_3^-$), a phosphonyl halide, a phosphonate monoester or monoamide ($PO_2^-ER^9$), a phosphonate diester or diamide ($POER^9ER^{10}$), a thiophosphate ($PSO_3^-$), a thiophosphate monoester or monoamide ($PSO_2^-ER^9$), a thiophosphate diester or diamide ($PSOER^9ER^{10}$), a thiophosphonate ($PSO_2^-$), a thiophosphonyl halide, a thiophosphonate monoester or monoamide ($PSO^-ER^9$), a thiophosphonate diester or diamide ($PSER^9ER^{10}$), a phosphonamide ($PONR^9R^{10}NR^{12}R^{13}$), a phosphonamide thioanalogue ($PSNR^9R^{10}NR^{12}R^{13}$), a phosphoramide ($PONR^9R^{10}NR^{11}NR^{12}R^{13}$), a phosphoramide thioanalogue ($PSNR^9R^{10}NR^{11}NR^{12}R^{13}$), a phosphoramidite ($PO_2R^{12}NR^9R^{10}$) or a phosphoramidite thioanalogue ($POSR^{12}NR^9R^{10}$), where each E is independently N, NH, O or S;

$R^1$ in combination with $R^2$, $R^2$ in combination with $R^3$, $R^3$ in combination with $R^4$, $R^3$ in combination with $R^7$, $R^4$ in combination with $R^7$, or $R^4$ in combination with $R^5$ can independently form a 5-10 member ring structure which is saturated, unsaturated or aromatic, unsubstituted or comprising a heteroatom, and/or further substituted;

$R^9$, $R^{10}$, $R^{11}$, $R^{12}$ and $R^{13}$ are independently a hydrogen, a halogen, an amino group, an alkyl group wherein said alkyl group is saturated or unsaturated, linear or branched, or substituted or unsubstituted, an alkoxy group wherein said alkoxy group is saturated or unsaturated, branched or linear, or substituted or unsubstituted, an aryl group wherein said aryl group is unsubstituted or substituted; wherein $R^9$ in combination with $R^{10}$, $R^{12}$ in combination with $R^{13}$, $R^9$ in combination with $R^{11}$, $R^9$ in combination with $R^{12}$, $R^{10}$ in combination with $R^{13}$, or $R^{11}$ in combination with $R^{12}$ can independently form a 5-10 member ring;

X is O, $OR^{14}$, S, $SR^{15}$, $CR^{16}R^{17}$, $NR^{16}R^{17}$ or $N^+R^{16}R^{17}$; Y is O, $OR^{14}$, S, $SR^{15}$, $CR^{18}R^{19}$, $NR^{18}R^{19}$ or $N^+R^{18}R^{19}$, wherein $R^{14}$, $R^{15}$, $R^{16}$, $R^{17}$, $R^{18}$ and $R^{19}$ are independently H, alkyl, aryl, alkylcarbonyl, arylcarbonyl, or Q, in which the alkyl or aryl potions are unsubstituted or substituted, saturated or unsaturated, or $R^{16}$ in combination with $R^{17}$, or $R^{18}$ in combination with $R^{19}$ can independently form an unsubstituted or substituted 5-10 member ring structure, and $R^{16}$ in combination with $R^1$, $R^{17}$ in combination with $R^2$, $R^{18}$ in combination with $R^5$, or $R^{19}$ in combination with $R^6$, can independently form a 5- to 10-member ring structure that is saturated or unsaturated and substituted or unsubstituted;

Z is a pentavalent P or As;

A and B are substituents that link to Z through single or double bonds and are independently H, O, S, NH, F, Cl, Br, I, CN, nitro, azido, hydroxyl, amino, imino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl(aryl)aminocarbonyl, arylcarboxamido, or Q, the alkyl or alkoxy portions of which are saturated or unsaturated, linear or branched, and substituted or unsubstituted;

A in combination with B, A in combination with a ring formed by $R^1$ and $R^2$, B in combination with a ring formed by $R^4$ and $R^5$ of structures I or II, A in combination with $R^1$, B in combination with $R^6$, A in combination with $R^6$, or B in combination with $R^7$, can independently form a 5- to 10-member ring structure that is saturated or unsaturated, and unsubstituted or substituted; and $D^1$, $D^2$, $D^3$ and $D^4$ are either C or N, wherein only 1 or none of $D^1$, $D^2$, $D^3$ or $D^4$ are N.

In some embodiments of these dyes, at least one of $R^1$, $R^2$, $R^3$, $R^4$, $R^5$, $R^6$, $R^7$ and $R^8$ comprises an alkyl, alkoxy and/or aryl that is further substituted by F, Cl, Br, I, CN, OH, alkenyl, alkynyl, alkylcarbonyl, amide, or thioamide; and/or at least one of $R^1$, $R^2$, $R^3$, $R^4$, $R^5$, $R^6$, $R^7$ and $R^8$ comprises an alkyl and/or alkoxy that is further substituted by Q; and/or at least one of $R^1$ in combination with $R^2$, $R^2$ in combination with $R^3$, $R^3$ in combination with $R^4$, or $R^4$ in combination with $R^5$ independently forms a 5-10 member ring structure that is further substituted with an alkyl, an aryl, an alkenyl, an alkynyl, an alkoxy, an aroxyl, a hydroxyl, an F, a Cl, a Br, an I, a CN, a nitro, an alkylsulfonyl, an arylsulfonyl, an alkylsulfinyl, an arylsulfinyl, a (thio)carbonyl, a (thio)carboxylic acid, a (thio)carboxylic acid ester, a nitro, an amino, a (thio) amide, an azido, a hydrazino, or a (thio)phosphonate where each alkyl group or alkoxy group is independently saturated or unsaturated, linear or branched, or substituted or unsubstituted, and each aryl group is unsubstituted or substituted; and/or at least one of A or B is an alkyl or alkoxy that is further substituted by F, Cl, Br, I, CN, OH, alkenyl, alkynyl, alkylcarbonyl, amide, thioamide, or Q; and/or at least one of A in combination with B, A in combination with a ring formed by $R^1$ and $R^2$, B in combination with a ring formed by $R^4$ and $R^5$, A in combination with $R^1$, B in combination with $R^6$, A in combination with $R^6$, or B in combination with $R^7$, independently form a 5- to 10-member ring structure that is substituted with an alkyl, an aryl, an alkenyl, an alkynyl, an alkoxy, an aroxyl, a hydroxyl, an F, a Cl, a Br, an I, a CN, a nitro, a carbonyl, a thiocarbonyl, a thiocarboxylic acid, a thiocarboxylic acid ester, a nitro, an amino, a (thio) amide, an azido, a hydrazino, or Q, wherein the alkyl group herein is saturated or unsaturated, linear or branched, substituted or unsubstituted, an alkoxy group wherein the alkoxy group is saturated or unsaturated, branched or linear, substituted or unsubstituted.

In other embodiments of these dyes, at least one of the 5-10 member ring structure formed by $R^1$ in combination with $R^2$, $R^2$ in combination with $R^3$, $R^3$ in combination with $R^4$, or $R^4$ in combination with $R^5$ is substituted with an aryl substituted with an F, a Cl, a Br, an I, a CN, an OH, an alkyl, an alkenyl, an alkynyl, an alkoxy, an aryoxy, an alkylthio, an arylthio, a nitro, an azido, a hydrazino, a carboxyl, a thiocarboxyl, a carbonyl, a thiocarbonyl, a carboxylic acid ester, a thiocarboxylic acid ester, or an unsubstituted or substituted amino, amide, thioamide, or Q; and/or at least one of the 5-10 member ring structure formed by A in combination with B, A in combination with a ring formed by $R^1$ and $R^2$, B in combination with a ring formed by $R^4$ and $R^5$, A in combination with $R^6$, or B in combination with $R^7$ is substituted with an aryl group that is substituted with F, Cl, Br, I, CN, OH, alkenyl, alkynyl, alkoxy, aryoxy, alkylthio, arylthio, nitro, azido, hydrazino, carboxyl, thiocarboxyl, carbonyl, thiocarbonyl, carboxylic acid ester, thiocarboxylic acid ester, unsubstituted or substituted amino, amide, thioamide, or Q.

In various embodiments of these dyes, Z is P. In other embodiments, A is =O and B is —OH or —O⁻. In some of those embodiments, Z is P, A is =O and B is —OH or —O⁻.

Some of these dyes are coumarin analogs that comprise

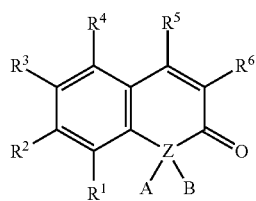

(Structure I). In some of these coumarin analogs, $R^1$-$R^6$ are independently any moiety that is present in a known coumarin dye (e.g., where Z is O). Similarly, this invention provides analogs of symmetric and asymmetric cyanine and styrene dyes (as described in U.S. Pat. No. 7,569,695) that are like any known cyanine and styrene dye, except where P or As substitutes for an oxygen in the heterocyclic ring structures.

Others of these dyes are xanthene analogs that comprise

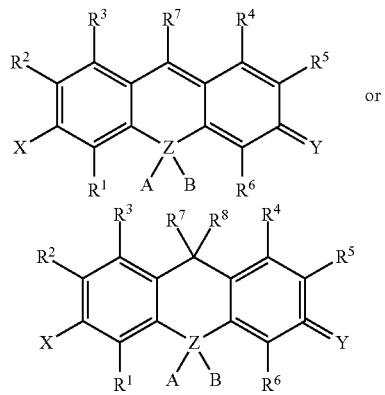

(Structures II and III), where

X is $O^{14}$, S, $SR^{15}$, $CR^{16}R^{17}$, $NR^{16}R^{17}$ or $N^+R^{16}R^{17}$; Y is $O^{14}$, S, $SR^{15}$, $CR^{18}R^{19}$, $NR^{18}R^{19}$ or $N^+R^{18}R^{19}$, wherein $R^{14}$, $R^{15}$, $R^{16}$, $R^{17}$, $R^{18}$ and $R^{19}$ are independently H, alkyl, aryl, alkylcarbonyl, arylcarbonyl, or Q, in which the alkyl or aryl potions are unsubstituted or substituted, saturated or unsaturated, or $R^{16}$ in combination with $R^{17}$, or $R^{18}$ in combination with $R^{19}$ can independently form an unsubstituted or substituted 5-10 member ring structure, and $R^{16}$ in combination with $R^1$, $R^{17}$ in combination with $R^2$, $R^{18}$ in combination with $R^5$, or $R^{19}$ in combination with $R^6$, can independently form a 5- to 10-member ring structure that is saturated or unsaturated and substituted or unsubstituted.

In some of these xanthene analogs, $R^1$-$R^8$ are independently any moiety present in a known xanthene dye (e.g., where Z=O).

Others of these xanthene analogs comprise the 5-10 member ring structure independently formed by $R^{16}$ in combination with $R^{17}$, and/or $R^{18}$ in combination with $R^{19}$, further substituted with alkyl, alkenyl, alkynyl, aryl, alkoxy, F, Cl, Br, I, carboxylic acid or carboxylic acid ester, where the alkyl group is saturated or unsaturated, linear or branched, and substituted or unsubstituted. In various aspects of these embodiments, the 5-10 member ring structure independently formed by $R^{16}$ in combination with $R^{17}$, and/or $R^{18}$ in combination with $R^{19}$ comprises an alkyl group that is further substituted by F, Cl, Br, I, CN, OH, alkenyl, alkynyl, nitro, azido, hydrazino, alkoxy, aryoxy, alkylthio, arylthio, thiocarboxyl, carbonyl, thiocarbonyl, thiocarboxylic acid ester, unsubstituted or substituted amino, amide, thioamide, or Q, and/or an aryl group that is further substituted by F, Cl, Br, I, CN, OH, alkoxy, aryoxy, alkylthio, arylthio, nitro, azido, hydrazino, carboxyl, thiocarboxyl, carbonyl, thiocarbonyl, carboxylic acid ester, thiocarboxylic acid ester, unsubstituted or substituted amino, amide, thioamide, or Q.

Some xanthene analogs of the present invention comprise

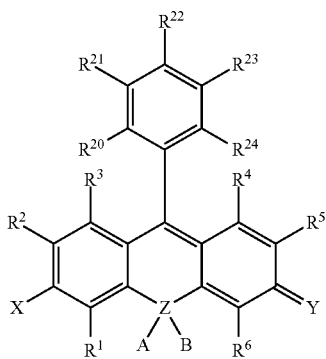

where $R^{20}$, $R^{21}$, $R^{22}$, $R^{23}$ and $R^{24}$ are independently H, F, Cl, Br, I, CN, nitro, azido, hydroxyl, amino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl (aryl)aminocarbonyl, arylcarboxamido, or Q, the alkyl or alkoxy portions of which are saturated or unsaturated, linear or branched, and substituted or unsubstituted. In various aspects of these embodiments, at least one of $R^{20}$, $R^{21}$, $R^{22}$, $R^{23}$ and $R^{24}$ is independently alkyl or alkoxy further substituted by F, Cl, Br, I, CN, OH, alkenyl, alkynyl, alkylcarbonyl, amide, thioamide, or Q. In other aspects, either $R^{22}$ or $R^{24}$ is —COOH, —O(CH$_2$)$_n$ COOH or SO$_3$H, wherein n=1-10.

Specific embodiments of the dyes of the present invention comprise

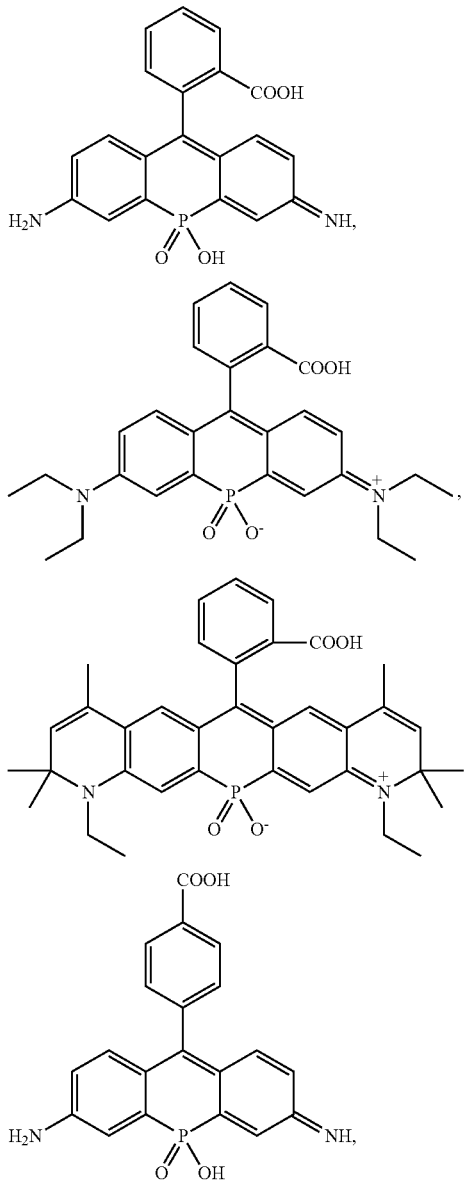

-continued
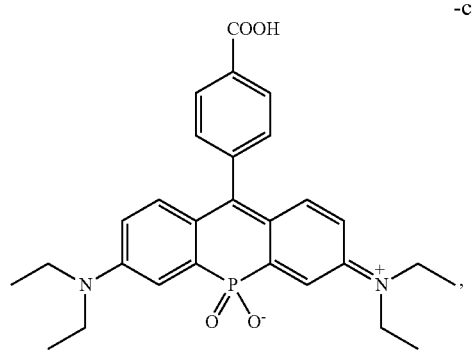
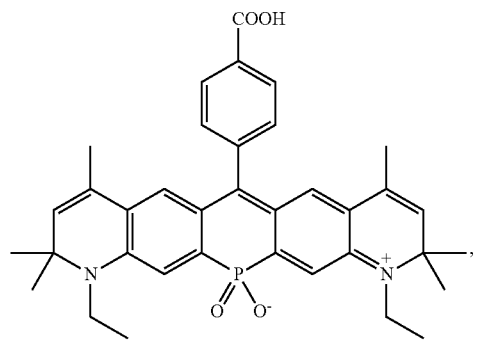
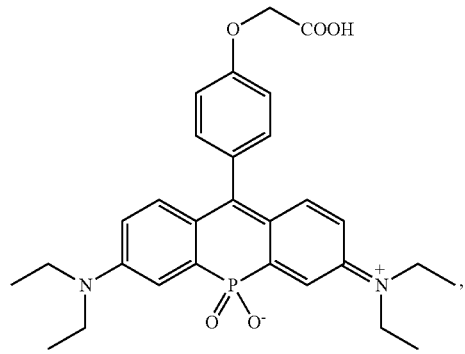
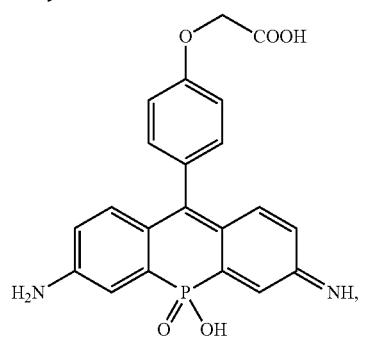
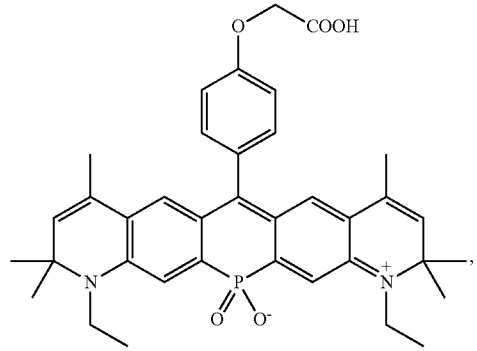

-continued
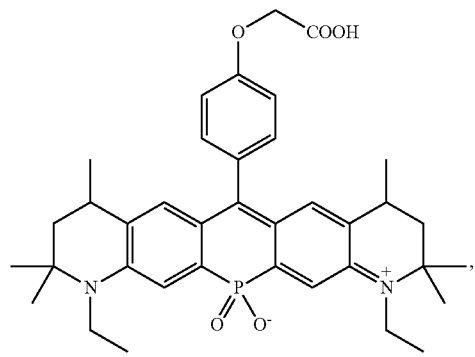
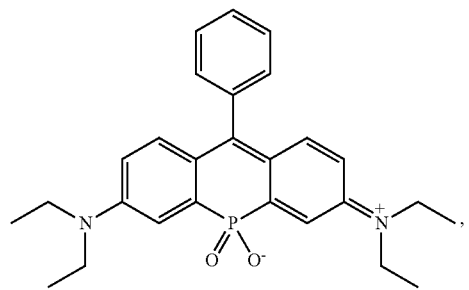
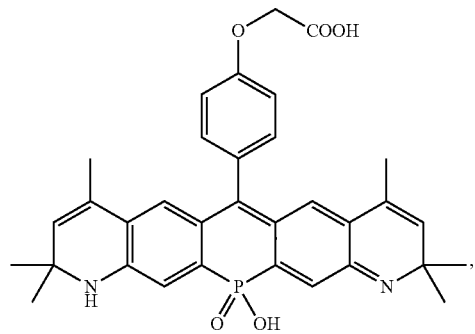
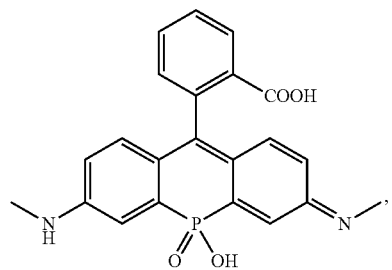
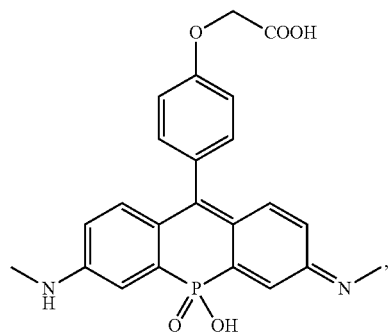

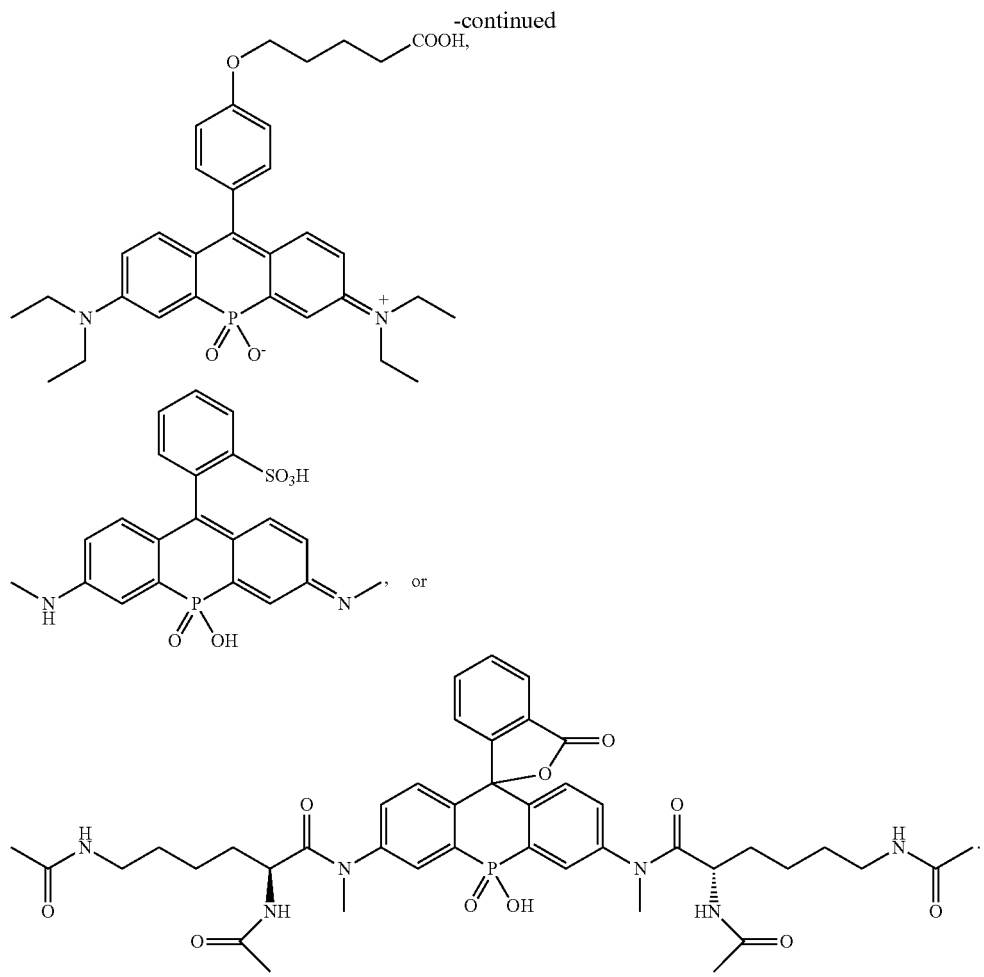

The fluorescent dyes described above may usefully be attached to a target molecule. Nonlimiting examples of a target molecule useful herein is a nucleic acid, a nucleic acid analog, a protein, a peptide, an antibody, an antibody fragment, a carbohydrate, a polysaccharide, an oligosaccharide, a nucleotide, a nucleotide analog, a hapten, or an organic compound less than 2000 daltons. In various aspects of these embodiments, the target molecule is a molecule that can bind noncovalently to a molecule of interest. Examples include an antibody that binds to an antigen molecule of interest, and a nucleic acid that binds to a complementary nucleic acid. Binding between the target molecule and its corresponding molecule of interest may be monitored by essentially determining the presence or amount of dye that is bound to the molecule of interest.

These assays may be carried out where one component is fixed to a solid support and a corresponding partner is in solution. By binding to the component fixed to the support, the partner becomes attached to the support as well. Examples of this are microarray assays where labeled analytes become bound to discrete sites on the microarray. The dyes of the present invention can also be utilized in homogeneous probe-dependent assays. Examples of such assays are energy transfer between adjacent probes (U.S. Pat. No. 4,868,103), the Taqman exonuclease assay (U.S. Pat. Nos. 5,538,848 and 5,210,015), Molecular Beacons (U.S. Pat. Nos. 5,118,801 and 5,925,517) and various real time assays (U.S. Patent Publication 20050137388).

The fluorescent dyes can be attached to a target molecule by any method known in the art. In some embodiments, any of the fluorescent dyes described above further comprises a reactive group, which, as is known in the art, can facilitate attachment of a dye to a target molecule. Nonlimiting examples of reactive groups that can be utilized with these dyes include nucleophilic reactive groups, electrophilic reactive groups, terminal alkenes, terminal alkynes, platinum coordinate groups and alkylating agents. Examples of electrophilic reactive groups include isocyanate, isothiocyanate, monochlorotriazine, dichlorotriazine, 4,6,-dichloro-1,3,5-triazines, mono- or di-halogen substituted pyridine, mono- or di-halogen substituted diazine, maleimide, haloacetamide, aziridine, sulfonyl halide, acid halide, hydroxysuccinimide ester, hydroxysulfosuccinimide ester, imido ester, hydrazine, azidonitrophenol, azide, 3-(2-pyridyl dithio)-proprionamide, glyoxal and aldehyde groups. Examples of nucleophilic reactive groups include reactive thiol, amine and hydroxyl groups. For synthesis of dyes, reactive thiol, amine or hydroxyl groups can be protected during various synthetic steps, where the reactive groups are generated after removal of the protective group. Use of a terminal alkene or alkyne groups for attachment of markers is described, e.g., in U.S. Patent Application 2003/0225247. The use of platinum coordinate reactive groups is described, e.g., in U.S. Pat. No. 5,580,990, and the use of alkyl groups is described, e.g., in U.S. Pat. No. 6,593,465.

Thus, in some embodiments, the above-described dyes further comprise a reactive group L. Specific examples of L are an isocyanate, an isothiocyanate, a monochlorotriazine, a dichlorotriazine, a 4,6-dichloro-1,3,5-triazines, a mono- or di-halogen substituted pyridine, a mono- or di-halogen substituted diazine, a maleimide, a haloacetamide, an aziridine, a sulfonyl halide, a carboxylic acid, an acid halide, a phosphonyl halide, a phosphoramidite ($PO_2R^{12}NR^9R^{10}$), a phosphoramidite thioanalogue ($POSR^{12}NR^9R^{10}$), a hydroxysuccinimide ester, a hydroxysulfosuccinimide ester, an imido ester, an azido, a nitrophenol ester, an azide, a 3-(2-pyridyl dithio)-propionamide, a glyoxal, an aldehyde, a thiol, an amine, a hydrazine, a hydroxyl, a terminal alkene, a terminal alkyne, a platinum coordinate group and an alkylating agent.

In some of these embodiments, the fluorescent dye comprises

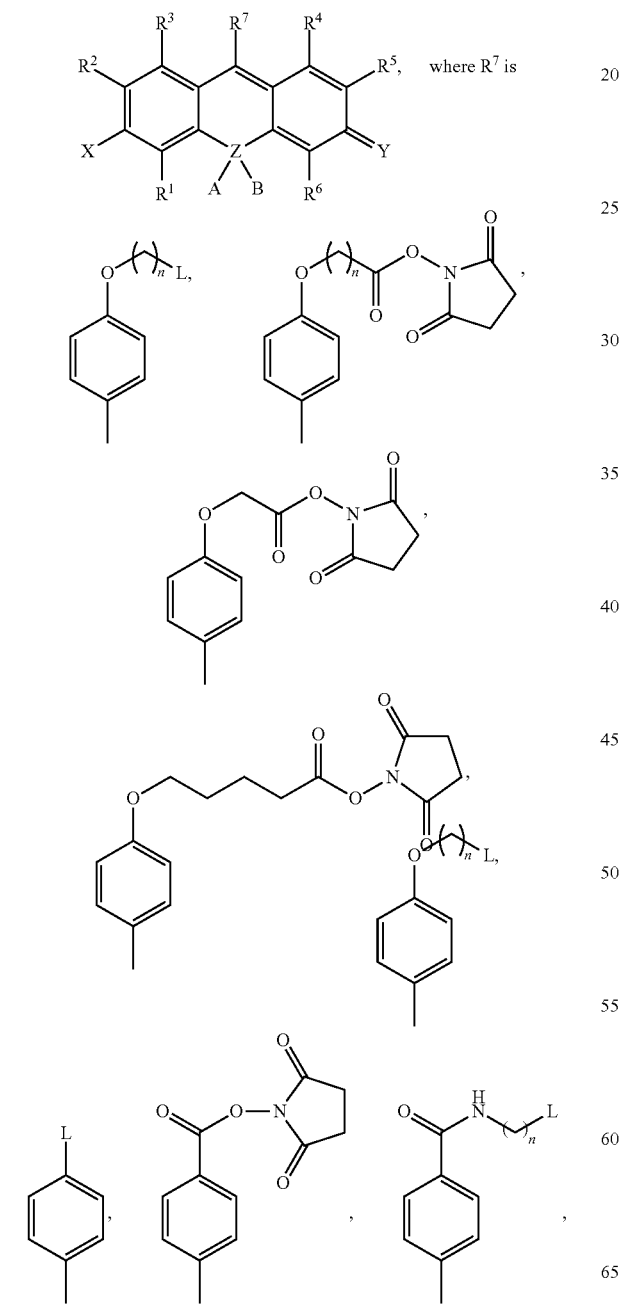

In additional embodiments, the fluorescent dye comprises

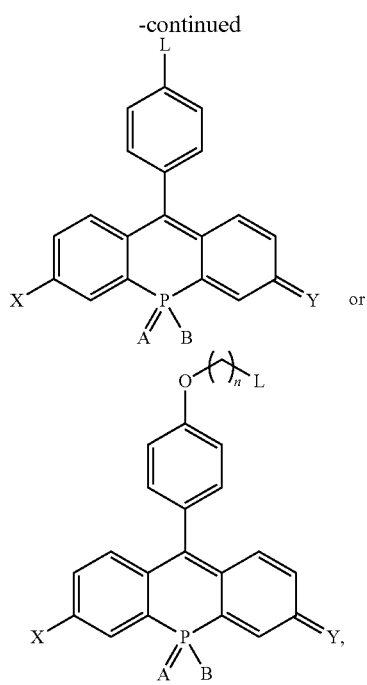
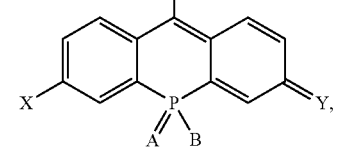
where X and Y are
(a) NH₂ and NH, respectively;
(b) —NHCH₂CH₃ and —NCH₂CH₃, respectively;
(c) —NHCH₃ and —NCH₃, respectively;
(d) —N(CH₂CH₃)₂ and —N⁺(CH₂CH₃)₂, respectively; or
(e) a tertiary amine and a quaternary ammonium in a ring system, respectively.
In specific embodiments, the fluorescent dye comprises
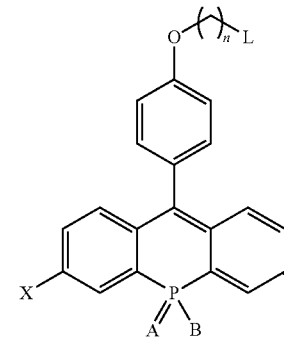
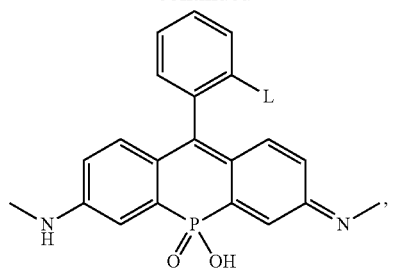
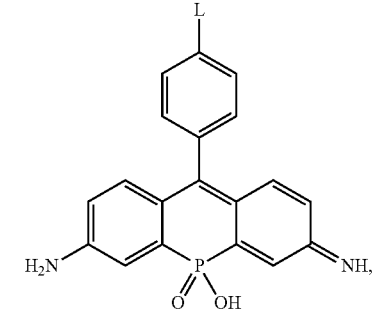
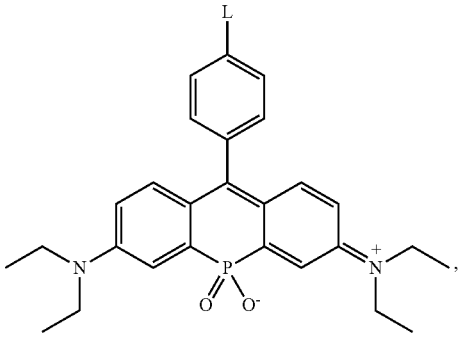
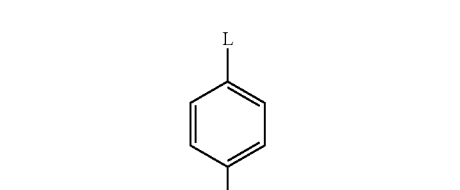
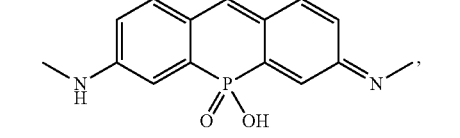
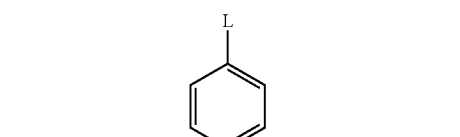
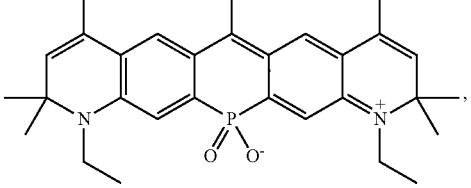

25
-continued
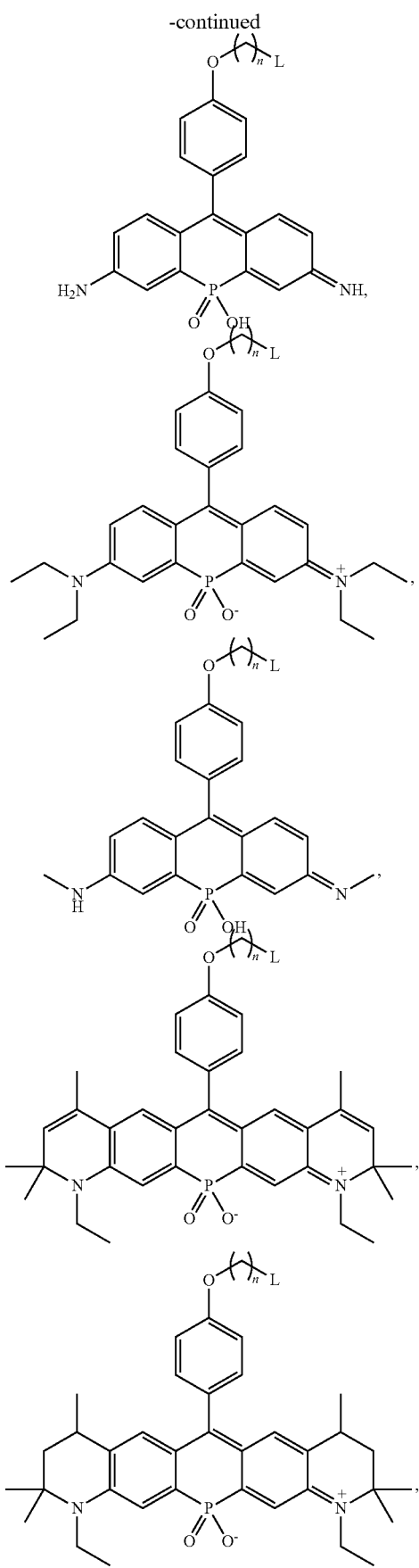
26
-continued
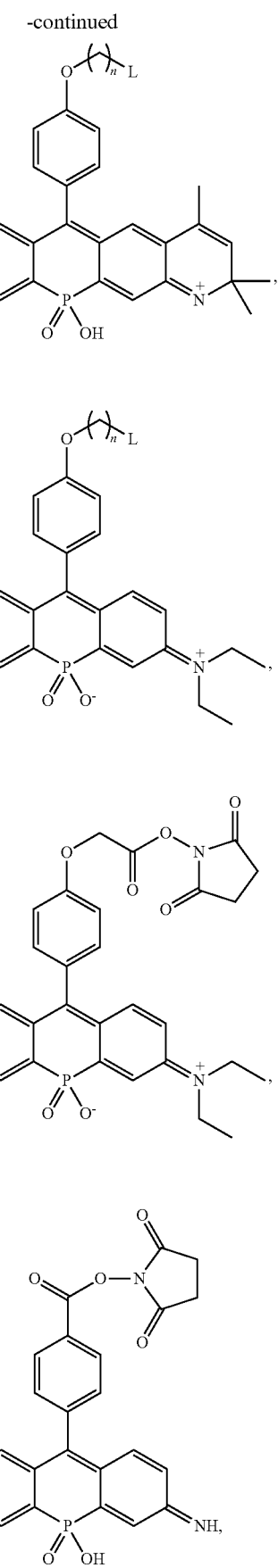

-continued
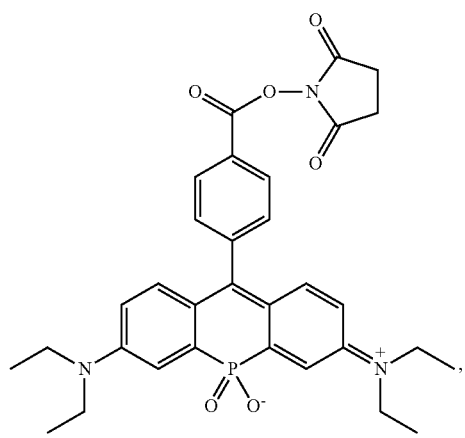
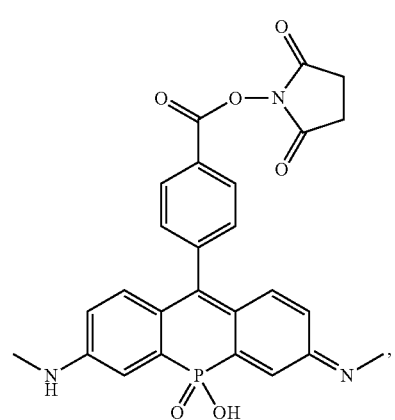
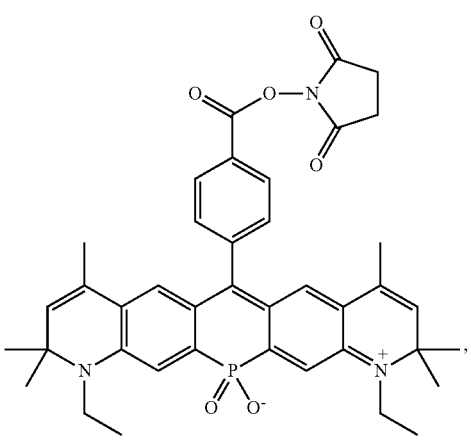
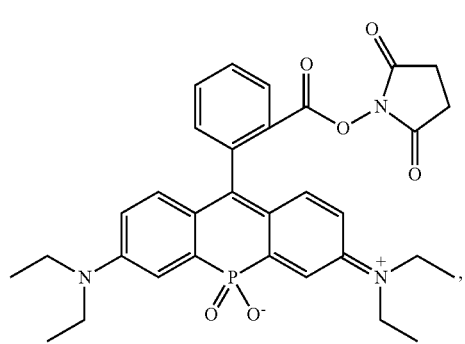
-continued
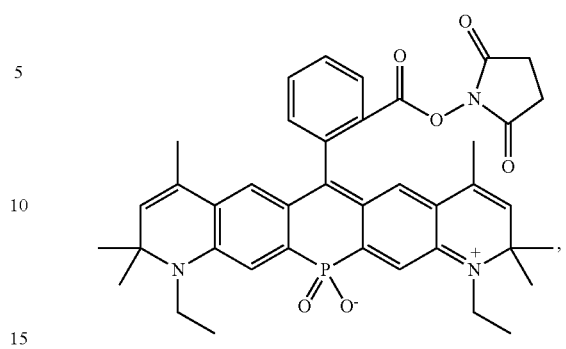
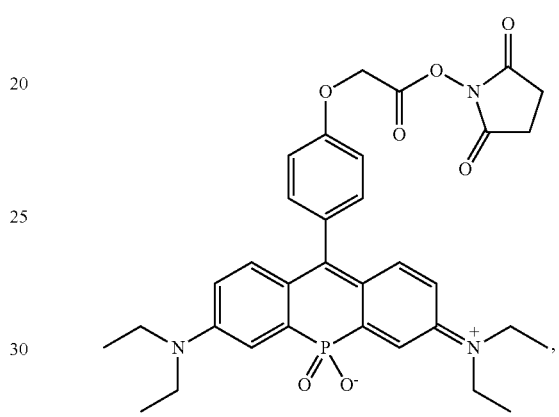
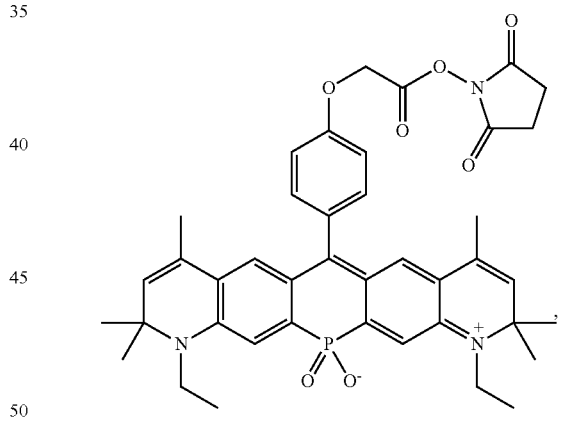
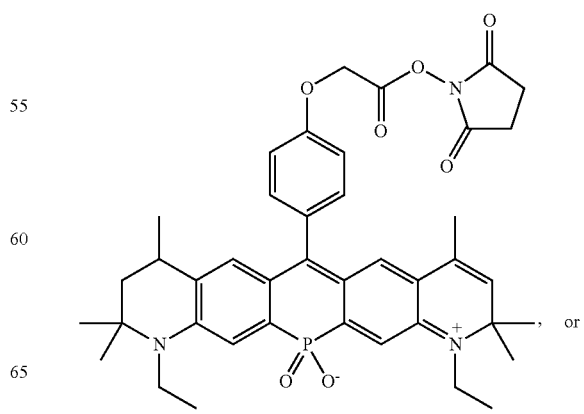

-continued

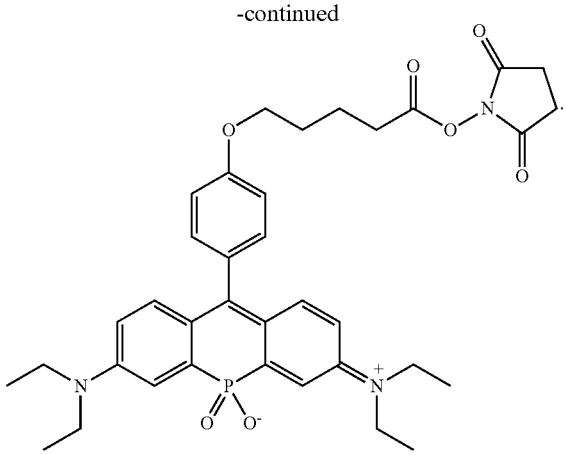

The invention fluorescent dyes can also be bound to a target molecule noncovalently, e.g., through a binding pair, where the dye is covalently or noncovalently bound to one member of the binding pair and the target molecule is covalently or noncovalently bound to the other member of the binding pair. Nonlimiting examples of a binding pair is a sugar/lectin, an antigen/antibody, a hapten/antibody, a ligand/receptor, a hormone/receptor, an enzyme/substrate, biotin/avidin, and biotin/streptavidin.

Thus, in various embodiments, the fluorescent dye further comprises a member of a binding pair. The binding pair can be bound to the fluorescent dye by any means known in the art. In some embodiments, the member of a binding pair is covalently bound to the fluorescent dye through reactive group L.

The fluorescent dyes of the present invention can usefully be combined with another fluorescent dye to utilize energy transfer between the two dyes in assays (e.g., TaqMan and molecular beacon assays) as discussed above. In various aspects of these embodiments, the two dyes are on the same target molecule or on different target molecules. In other aspects, the dyes of the present invention have dyes as targets, thereby creating composite dyes. By joining the dyes of the present invention to another dye, unique properties are often created that are not present in either dye alone. For example, if one of the dyes of the present invention is joined to another dye such that it creates an extended conjugation system, the spectral characteristics of the dye may be different than either dye component. Another example of this method is where the conjugation systems do not overlap but the proximity allows an internal energy transfer to take place thereby extending the Stokes shift. See, e.g., U.S. Pat. Nos. 5,401,847, 6,008,373 and 5,800,996. Other properties may also be enhanced by this joining. For example, joining two ethidium bromide molecules together generates a dye that has enhanced binding to nucleic acids (U.S. Patent Publication 2003/0225247). Other composite dyes simultaneously enjoy both enhanced binding and energy transfer (see, e.g., U.S. Pat. No. 5,646,264). Furthermore, these composites dyes are not limited to binary constructs of only two dyes, but may comprise oligomeric or polymeric dyes. These composite dyes may be comprised of the same dye, or different dyes may be joined together depending upon the properties desired.

Thus, a fluorescence energy transfer system is provided herein. This system comprises any of the above-described fluorescent dyes and a second dye, wherein the second dye is capable of energy transfer with the fluorescent dye. The two dyes can be joined to the same target molecule, e.g., a nucleic acid, or each to a different target molecule, e.g., two complementary nucleic acids where energy transfer takes place when the two complementary nucleic acids hybridize. Alternatively, the two dyes can be joined together, e.g., in the composite dyes described above. In additional embodiments of this fluorescence energy transfer system, the two dyes are present separately in a kit, e.g., a kit for labeling a target molecule.

In additional embodiments, the dye of the present invention is bound to a target molecule by contacting reactive group L with the target molecule such that reactive group L reacts with the target molecule to form a covalent bond between reactive group L and the target molecule.

In further embodiments, the dye of the present invention is noncovalently bound to a target molecule through a first member of a binding pair on the target molecule and a second member of the binding pair bound to the fluorescent dye through reactive group L. In various aspects of these embodiments, the first member of the binding pair is a sugar, a lectin, an antigen, a hapten, an antibody, a receptor ligand, a receptor, a hormone ligand, a hormone receptor, an enzyme, an enzyme substrate, biotin, digoxigenin, avidin, or streptavidin.

A variety of linker arms known in the art may also be used to distance the invention dyes from targets bound thereto. Commonly used constituents for linkers are chains that contain varying amounts of carbon, nitrogen, oxygen and sulfur. Examples of linkers using some of these combinations are described, e.g., in U.S. Pat. No. 4,707,440. Bonds joining together the constituents can be simple carbon-carbon bonds or they may be acyl bonds (U.S. Pat. No. 5,047,519), sulfonamide moieties (U.S. Pat. No. 6,448,008) and polar groups (U.S. Patent Publication 2003/0225247).

Thus, in further embodiments, a target molecule is provided that is labeled with any of the dyes described above. As discussed above, nonlimiting examples of the target molecule is a nucleic acid, a nucleic acid analog, a protein, a peptide, an antibody, an antibody fragment, a carbohydrate, a polysaccharide, an oligosaccharide, a nucleotide, a nucleotide analog, a hapten, or an organic compound less than 2000 daltons. In various embodiments, the target molecule is a nucleic acid. In other embodiments, the target molecule is a protein.

In some of these labeled target molecules, the fluorescent dye is covalently bound to the target molecule, e.g., where the fluorescent dye is bound to the target molecule through a reactive group. In others, the fluorescent dye is bound to the target molecule through a binding pair.

In others of these labeled target molecules, the target molecule further comprises a second dye such that the second dye forms an energy transfer pair with the fluorescent dye.

Preferred embodiments are described in the following examples. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims, which follow the examples.

Example 1

Synthesis of bis(3-nitrophenyl)phosphinic acid

The compound diphenylphosphinic acid (25.0 g, 0.11 mol) was added in small batches to a mixture of nitric acid (140 mL) and sulfuric acid (28 mL), cooling with ice-water bath. After the addition, the mixture was stirred at room temperature overnight. The mixture was poured onto ice (1000 g). The precipitate was collected by filtration, and then washed by cold water three times. It was air dried to give off-white solid (34.0 g, 96%). The structure of bis(3-nitrophenyl)phosphinic acid is:

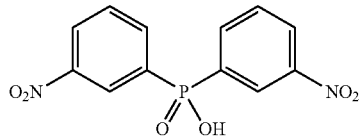 [SMILES: O=[N+]([O-])c1cccc(P(=O)(O)c2cccc([N+](=O)[O-])c2)c1]

Example 2

Synthesis of bis(3-aminophenyl)phosphinic acid

The compound bis(3-nitrophenyl)phosphinic acid (14.0 g, 45.4 mmol) from Example 1 was suspended in methanol (200 ml). Platinum (5 wt. %, on activated carbon, 1.4 g) was added. The mixture was shaken on a hydrogenation apparatus (50 psi) until no further hydrogen consumption was observed. The mixture was filtered through celite and then evaporated to dryness. The solid obtained (9.87 g, 88%) was used without purification. The structure of bis(3-aminophenyl)phosphinic acid is:

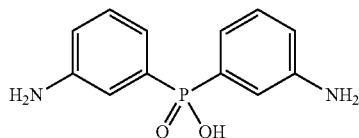

Example 3

Synthesis of bis(3-(diethylamino)phenyl)phosphinic acid

The compound bis(3-aminophenyl)phosphinic acid (1.49 g, 6 mmol) was dissolved in N,N-dimethylformamide. Calcium carbonate (3.0 g, 30 mmol) and ethyl iodide (4.7 g, 30 mmol) were subsequently added. The mixture was heated at 120° C. with vigorous stirring for 18 hours. After the mixture was cooled to room temperature, it was filtered through a pad of celite. The solvent was evaporated under vacuum. The residue was purified by flash chromatography (mobile phase: 10% methanol in chloroform to 50% methanol in chloroform) to give white solid (1.77 g, 82% yield). The structure of bis(3-(diethylamino)phenyl)phosphinic acid is:

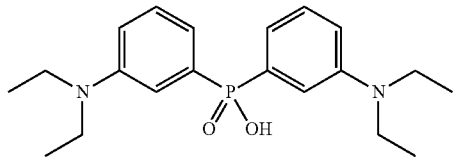 [SMILES: CCN(CC)c1cccc(P(=O)(O)c2cccc(N(CC)CC)c2)c1]

Example 4

Synthesis of bis(2,2,4-trimethyl-1,2-dihydroquino-lin-7-yl)phosphinic acid

The compounds bis(3-aminophenyl)phosphinic acid (9.8 g, 39.5 mmol) (Example 2) and mesityl oxide (10.54 mL, 82.9 mmol) were heated at reflux in acetic acid for 18 hours. After the mixture was cooled to room temperature, conc. hydrobromic acid (17.5 mL) was added. The mixture was heated up to 90° C. and maintained at this temperature for 20 hours. The solvent was removed under vacuum. The residue was dissolve in water (100 mL) and neutralized with 1N aqueous sodium hydroxide. Water was removed under vacuum. The solid was extracted with methanol. Subsequent evaporation of the methanol under vacuum provided crude product, which was purified by flash chromatography (mobile phase: 10% methanol in chloroform to 50% methanol in chloroform) to give yellowish solid (7.3 g, 45% yield). The structure of bis(2,2,4-trimethyl-1,2-dihydroquinolin-7-yl)phosphinic acid is:

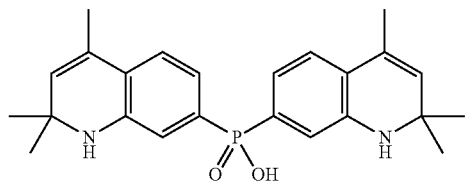

Example 5

Synthesis of bis(1-ethyl-2,2,4-trimethyl-1,2-dihydro-quinolin-7-yl)phosphinic acid To the suspension of the compound bis(2,2,4-trimethyl-1,2-dihydroquinolin-7-yl)phosphinic acid (5.60 g, 13.7 mmol) (Example 4) and calcium carbonate (6.85 g, 68.5 mmol) in anhydrous DMF (100 mL), was added ethyl iodide (10.70 ml, 68.5 mmol). The mixture was heated at 120° C. for 18 hours. After the mixture was filtered through a pad of celite, the solvent was removed under vacuum. The residue was purified by flash chromatography (mobile phase: 10% methanol in chloroform to 50% methanol in chloroform) to give off-white solid (4.92 g, 77 mmols). The structure of bis(1-ethyl-2,2,4-trimethyl-1,2-dihydroquinolin-7-yl)phosphinic acid is:

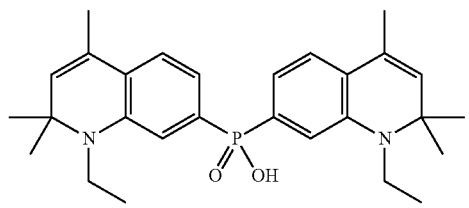

Example 6

Synthesis of bis(1-ethyl-2,2,4-trimethyl-1,2,3,4-tet-rahydroquinolin-7-yl)phosphinic acid To a solution of the compound bis(1-ethyl-2,2,4-trimethyl-1,2-dihydroquinolin-7-yl)phosphinic acid (4.22 g, 9.1 mmol) (Example 5) in methanol (100 mL), was added platinum (0.42 g, 5 wt. % on activated carbon). The mixture was stirred under hydrogen (50 psi) for 5 hours. The mixture was filtered through a pad of celite and then evaporated to dryness to give white solid (4.09 g, 96% yield). It is used without further purification. The structure of bis(1-ethyl-2,2,4-trimethyl-1,2,3,4-tetrahydroquinolin-7-yl)phosphinic acid is:

33

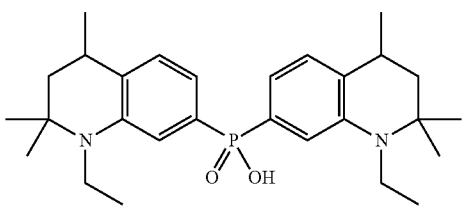

Example 7

Synthesis of bis(3-(methylamino)phenyl)phosphinic acid

The compound bis(3-aminophenyl)phosphinic acid (2.48 g, 10.0 mmol) (Example 2) and sodium methoxide (5.40 g, 100.0 mmol) were mixed in methanol (50 mL). After paraformaldehyde (0.90 g, 30.0 mmol) was added, the mixture was stirred at room temperature for 4 hours. Sodium boron hydride (0.76 g, 20.0 mmol) was then added. The mixture was then heated to reflux for 2 hours. The solvent was removed under vacuum. Aqueous potassium hydroxide (1M, 30 mL) was added to the residue and stirred for 3 hours. The volatile components were evaporated under vacuum. The residue was purified by flash chromatography (mobile phase: 10% methanol in chloroform to 50% methanol in chloroform) to give off-white solid (2.26 g, 82% yield). The structure of bis(3-methylamino)phenyl)phosphinic acid is:

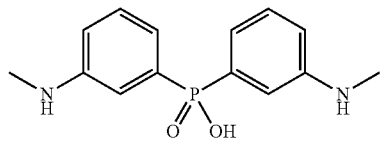

Example 8

Synthesis of 5-(4-formylphenoxy)pentanoic acid

Methyl 5-bromovelerate (13.4 g, 68.6 mmol) and anhydrous potassium carbonate (18.93 g, 137 mmol) was added to a solution of 4-hydroxybenzaldehyde (8.38 g, 68.6 mmol) in anhydrous acetone (140 ml). The mixture was heated at reflux for 16 hours with vigorous stirring. After the mixture was cooled to room temperature and filtered, the solvent was removed under vacuum. The residue was dissolved in dichloromethane (200 mL) and washed sequentially with aqueous sodium hydroxide (1 N, 200 ml), water (200 ml) and brine (200 ml). The solvent was evaporated under vacuum to give a yellowish crystal.

The crystal was dissolved in a mixture of THF (200 ml) and hydrochloric acid (6 N, 30 ml). The mixture was then heated to reflux for 3 hours, after which the THF was removed under vacuum. The oil was then extracted with chloroform (4×50 ml). The combined chloroform layer was washed with water (2×150 ml) and brine (200 ml), and then dried with anhydrous sodium sulfate. After the solvent was removed, the acid was obtained as a yellow liquid. The structure of 5-(4-formylphenoxy)pentanoic acid is:

34

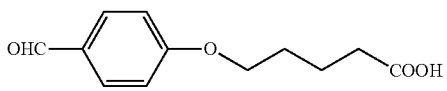 [SMILES: O=Cc1ccc(OCCCCC(=O)O)cc1]

Example 9

Synthesis of Dye 1

The compound bis(3-aminophenyl)phosphinic acid (1.24 g, 5.0 mmol) (Example 2) was added slowly to 60% sulfuric acid (10 mL) with stirring, followed by the addition of phthalic acid (0.83 g, 5.0 mmol). The mixture was heated at 180-200° C. in a microwave reactor for 2 hours. After the mixture was cooled to room temperature, it was neutralized by addition of solid potassium carbonate. Methanol (50 mL) was added. After the precipitated inorganic salt was removed by filtration, the solvent was removed under vacuum. The residue was purified by flash chromatography (mobile phase: 20% methanol in chloroform to 60% methanol in chloroform) to give Dye 1 as dark solid (156 mg, 8.2% yield). $\lambda_{abs}$=635 nm (in methanol), $\lambda_{em}$=655 nm (in methanol). The structure of Dye 1 is:

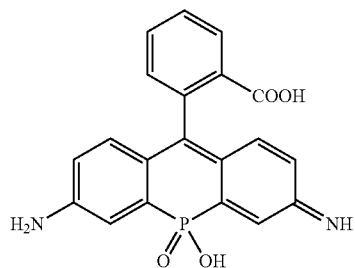

Example 10

Synthesis of Dye 2

Dye 2 (shown below) was prepared using the procedure described in Example 9 except that bis(3-(diethylamino)phenyl)phosphinic acid (Example 3) substituted for bis(3-aminophenyl)phosphinic acid (Example 2). Yield: 12%. $\lambda_{abs}$=670 nm (in methanol), $\lambda_{em}$=690 nm (in methanol).

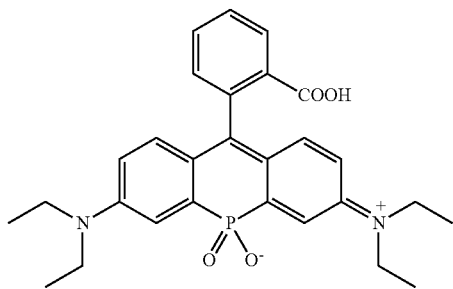

Example 11

Synthesis of Dye 3

Dye 3 (shown below) was prepared using the procedure described in Example 9 except that bis(1-ethyl-2,2,4-trimethyl-1,2-dihydroquinolin-7-yl)phosphinic acid (Example 5) substituted for bis(3-aminophenyl)phosphinic acid (Example 2). Yield: 5.6%. $\lambda_{abs}$=715 nm (in methanol), $\lambda_{em}$=732 nm (in methanol).

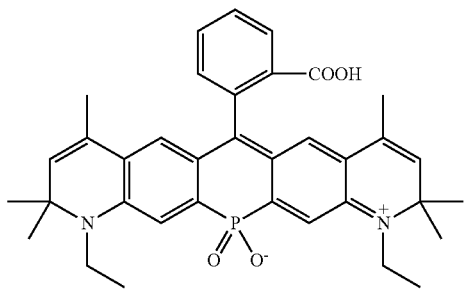

Dye 3

Example 12

Synthesis of Dye 4

The compound bis(3-(diethylamino)phenyl)phosphinic acid (1.0 g, 4.03 mmol) (Example 3) and 2-(4-formylphenoxy)acetic acid (0.72 g, 4.03 mmol) were dissolved in acetic acid (40 mL). After the mixture was heated at reflux for 20 hours, the solvent was removed under vacuum. The residue was dissolved in 10% methanol in chloroform (50 mL). Chloranil (1.09 g, 4.43 mmol) was added to the solution. The mixture was stirred at room temperature for 2 hours. The solvent was removed, and the residue purified by flash chromatography (mobile phase: 10% methanol in chloroform to 50% methanol in chloroform) to give dark solid (185.3 mg, 8.8% yield). $\lambda_{abs}$=665 nm (in methanol), $\lambda_{em}$=687 nm (in methanol). The structure of Dye 4 is:

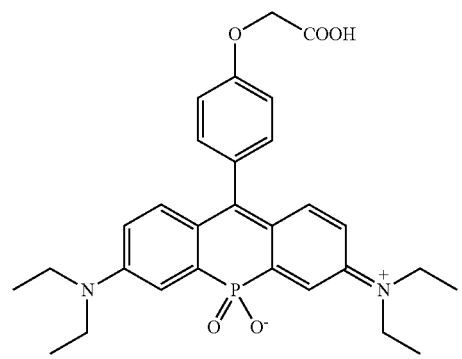

Dye 4

FIG. 1 shows spectral properties of Dye 4.

Example 13

Synthesis of Dye 5

Dye 5 (shown below) was prepared using the procedure described in Example 12 except that bis(3-aminophenyl) phosphinic acid (Example 2) substituted for bis(3-(diethylamino)phenyl)phosphinic acid (Example 3). Yield: 4.2%. $\lambda_{abs}$=633 nm (in methanol), $\lambda_{em}$=651 nm (in methanol).

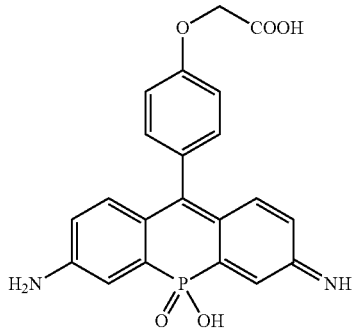

Dye 5

Example 14

Synthesis of Dye 6

Dye 6 (shown below) was prepared using the procedure described in Example 12 except that bis(1-ethyl-2,2,4-trimethyl-1,2-dihydroquinolin-7-yl)phosphinic acid (Example 5) substituted for bis(3-(diethylamino)phenyl)phosphinic acid (Example 3). Yield: 15.3%. $\lambda_{abs}$=708 nm (in methanol), $\lambda_{em}$=727 nm (in methanol).

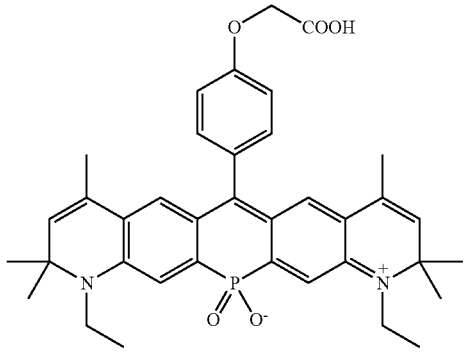

Dye 6

Example 15

Synthesis of Dye 7

Dye 7 (shown below) was prepared using the procedure described in Example 12 except that bis(1-ethyl-2,2,4-trimethyl-1,2,3,4-tetrahydroquinolin-7-yl)phosphinic acid (Example 6) substituted for bis(3-(diethylamino)phenyl)phosphinic acid (Example 3). Yield: 11.2%. $\lambda_{abs}$=678 nm (in methanol), $\lambda_{em}$=699 nm (in methanol).

Dye 7

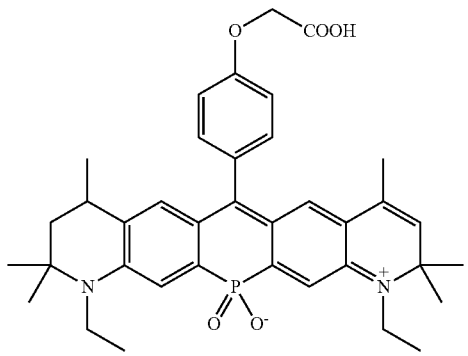

Example 16

Synthesis of Dye 8

Dye 8 (shown below) was prepared using the procedure described in Example 12 except that benzaldehyde substituted for 2-(4-formylphenoxy)acetic acid. Yield: 22.1%. $\lambda_{abs}$=669 nm (in methanol), $\lambda_{em}$=693 nm (in methanol).

Dye 8

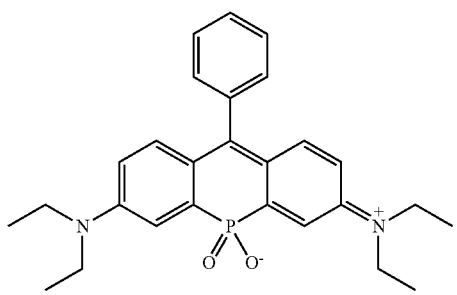

Example 17

Synthesis of Dye 9

Dye 9 (shown below) was prepared using the procedure described in Example 12 except that bis(2,2,4-trimethyl-1,2-dihydroquinolin-7-yl)phosphinic acid (Example 4) substituted for bis(3-(diethylamino)phenyl)phosphinic acid (Example 3). Yield: 6.4%. $\lambda_{abs}$=693 nm (in methanol), $\lambda_{em}$=713 nm (in methanol).

Dye 9

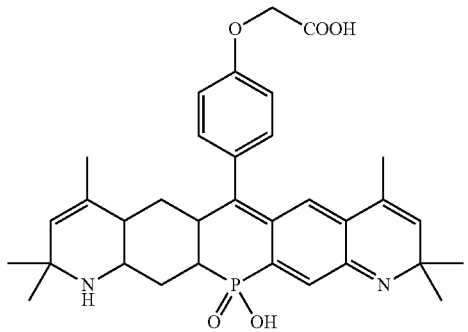

Example 18

Synthesis of Dye 10

Dye 10 (shown below) was prepared using the procedure described in Example 12 except that 2-carboxybenzaldehyde substituted for 2-(4-formylphenoxy)acetic acid. Yield: 5.1%. $\lambda_{abs}$=641 nm (in methanol), $\lambda_{em}$=661 nm (in methanol).

Dye 10

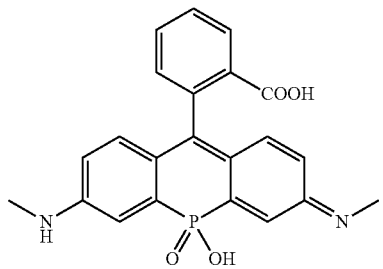

Example 19

Synthesis of Dye 11

Dye 11 (shown below) was prepared using the procedure described in Example 12 except that 2-formylbenzoic acid substituted for 2-(4-formylphenoxy)acetic acid. Yield: 21.5%. $\lambda_{abs}$=639 nm (in methanol), $\lambda_{em}$=660 nm (in methanol).

Dye 11

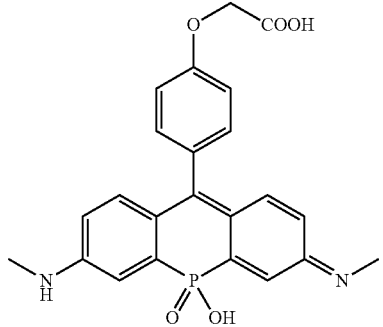

Figure 2:
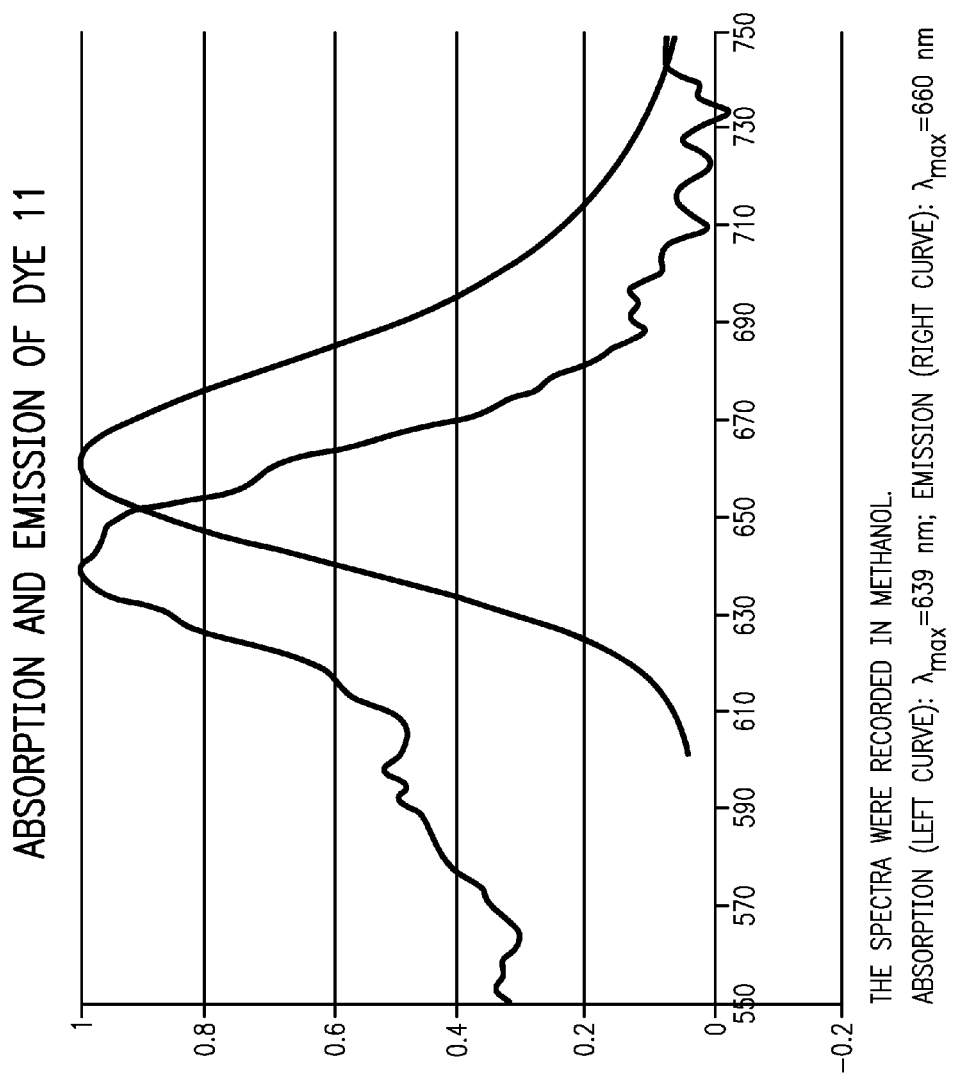
FIG. 2 is a graph showing spectral properties of Dye 11. The absorption and emission spectra of dye 11 were recorded in methanol, with excitation wavelength of 595 nm for emission spectrum.

FIG. 2 shows spectral properties of dye 11.

Example 20

Synthesis of Dye 12

Dye 12 (shown below) was prepared using the procedure described in Example 12 except that 5-(4-formylphenoxy) pentanoic acid (example 8) substituted for 2-(4-formylphenoxy)acetic acid. Yield: 18.3%. $\lambda_{abs}$=663 nm (in methanol), $\lambda_{em}$=686 nm (in methanol).

Dye 12

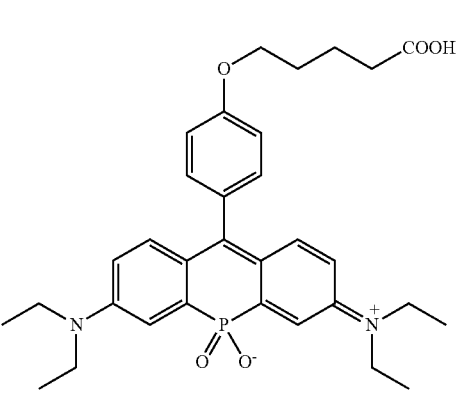

Example 21

Synthesis of Dye 13

Dye 13 (shown below) was prepared using the procedure described in Example 12 except that 2-formylbenzenesulfonic acid sodium salt substituted for 2-(4-formylphenoxy)acetic acid. Yield: 14.3%. $\lambda_{abs}$=649 nm (in methanol), $\lambda_{em}$=691 nm (in methanol).

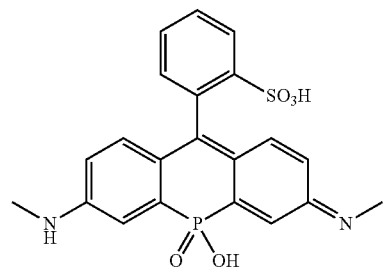

Dye 13

Figure 3:
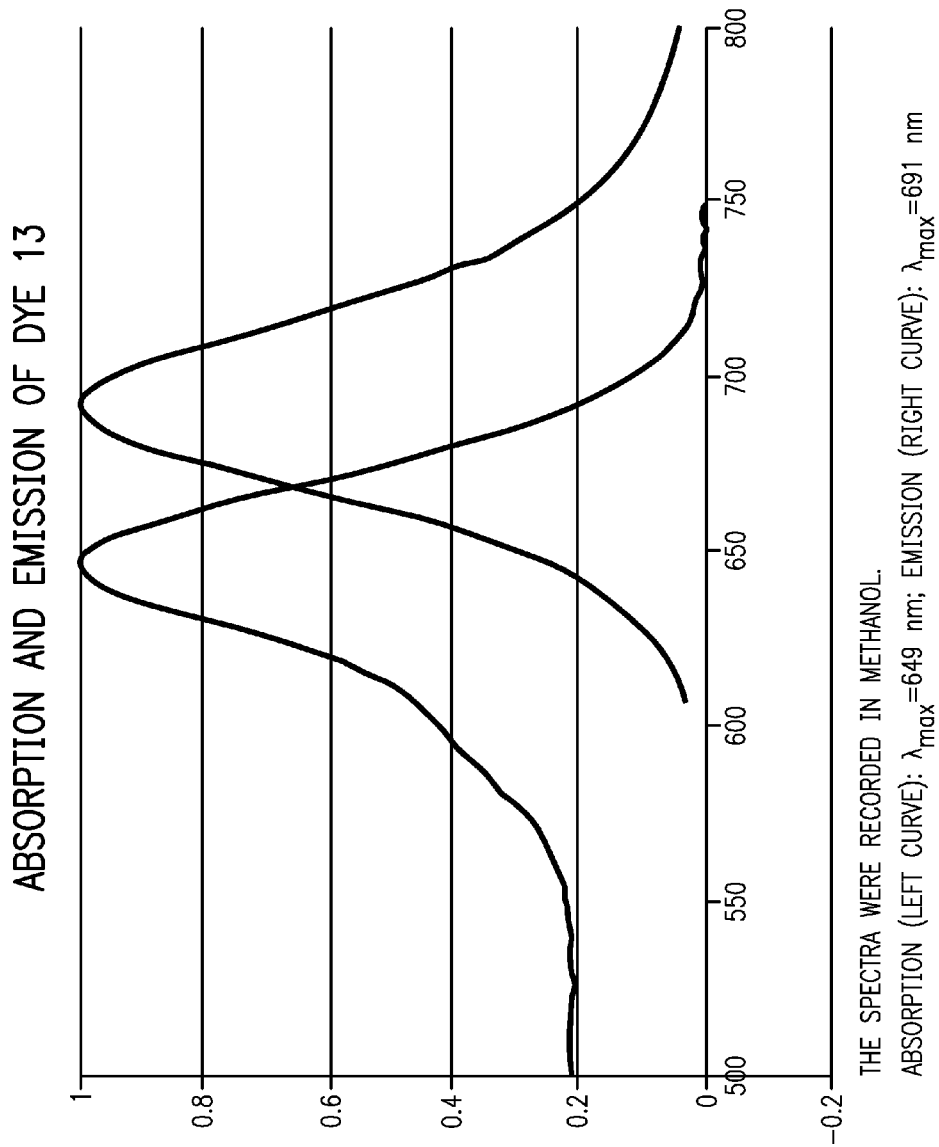
FIG. 3 is a graph showing spectral properties of Dye 13. The absorption and emission spectra of dye 11 were recorded in methanol, with excitation wavelength of 600 nm for emission spectrum.

FIG. 3 shows spectral properties of Dye 13.

Example 22

Synthesis of Compound 12 (Dye 10 with bis-diacetyl-lysine)

The compound dye 10 (138 mg, 0.34 mmol) (Example 18) was added to a solution of O-benzotriazole-N,N,N',N'-tetramethyl-uronium-hexafluoro-phosphate (HBTU) (1.0 g, 2.8 mmol), N,N'-diacetyllysine (0.66 mg, 0.87 mmol), and diisopropylethylamine (DIPEA) (0.30 mL, 2.8 mmol) in N,N-dimethylformamide (DMF) (10 mL). The mixture was heated at 110° C. for 12 hours. The solvent was removed under vacuum. The residue was purified by flash chromatography (mobile phase: 10% methanol in chloroform to 50% methanol in chloroform) to give yellowish, non-fluorescent solid (81.9 mg, 29% yield). The structure of Compound 12 is:

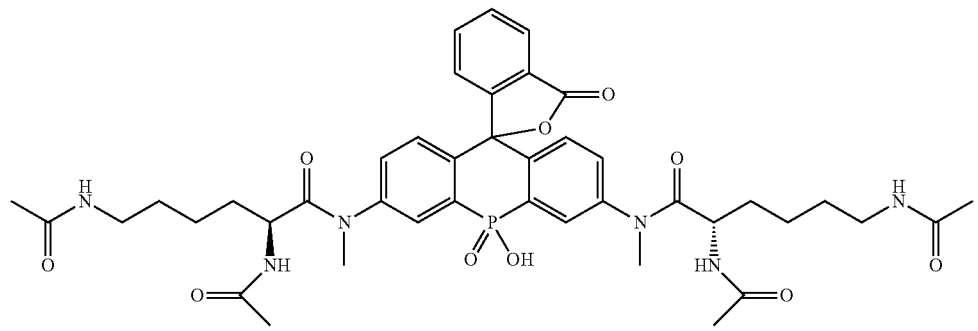 [SMILES: CC(=O)NCCCC[C@H](NC(C)=O)C(=O)N(C)c1ccc2c(c1)P(=O)(O)c1cc(N(C)C(=O)[C@H](CCCCNC(C)=O)NC(C)=O)ccc1C21OC(=O)c2ccccc21]

Example 23

Bioconjugation of Dye 4 to Oligonucleotide

Dye 4 (2 mmol) was dissolved in amine-free DMF (140 μl), followed by the addition of 2-succinimido-1,1,3,3-tetramethyluronium tetrafluoroborate (2.4 mmol) and diisopropylethylamine (4.4 mmol). The mixture was stirred at room temperature for 30 min, and then added to a solution of oligonucleotide containing an amine linker (80 nmol) in 0.1 M sodium borate buffer (320 μL, pH 8.5). The mixture was stirred at room temperature for 16 h. The solvent was removed under vacuum and the residue pellet was purified by HPLC using a gradient of triethylammonium acetate (0.1 M, pH 6.9) and acetonitrile as eluting solvents. The fractions containing pure conjugates were combined and evaporated, and then coevaporated with water to remove excessive salt. The final blue pellet was dissolve in water and stored at −20° C.

Example 24

Bioconjugation of Dye 6 with Streptavidin

Dye 6 (175 nmol) was dissolved in amine-free DMF (35 μl), followed by the addition of 2-succinimido-1,1,3,3-tetramethyluronium tetrafluoroborate (192.5 nmol) and diisopropylethylamine (350 nmol). The mixture was stirred at room temperature for 60 min, and then added in small aliquots to a solution of streptavidin (17.5 nmol) in 100 mM carbonate/bicarbonate buffer (350 μL). The mixture was stirred at room temperature for 1 hour. The mixture was loaded to the top of NAP™ 25 gel filtration column and eluted with 1×PBS buffer. The fractions containing the dye-streptavidin conjugate were combined. BSA solution (50 mM, 43.2 μL) and 20% NaN₃ solution (7.5 μL) were added. The mixture was stored at 4° C.

Example 25

HCV Test with Dye 4

Figure 4:
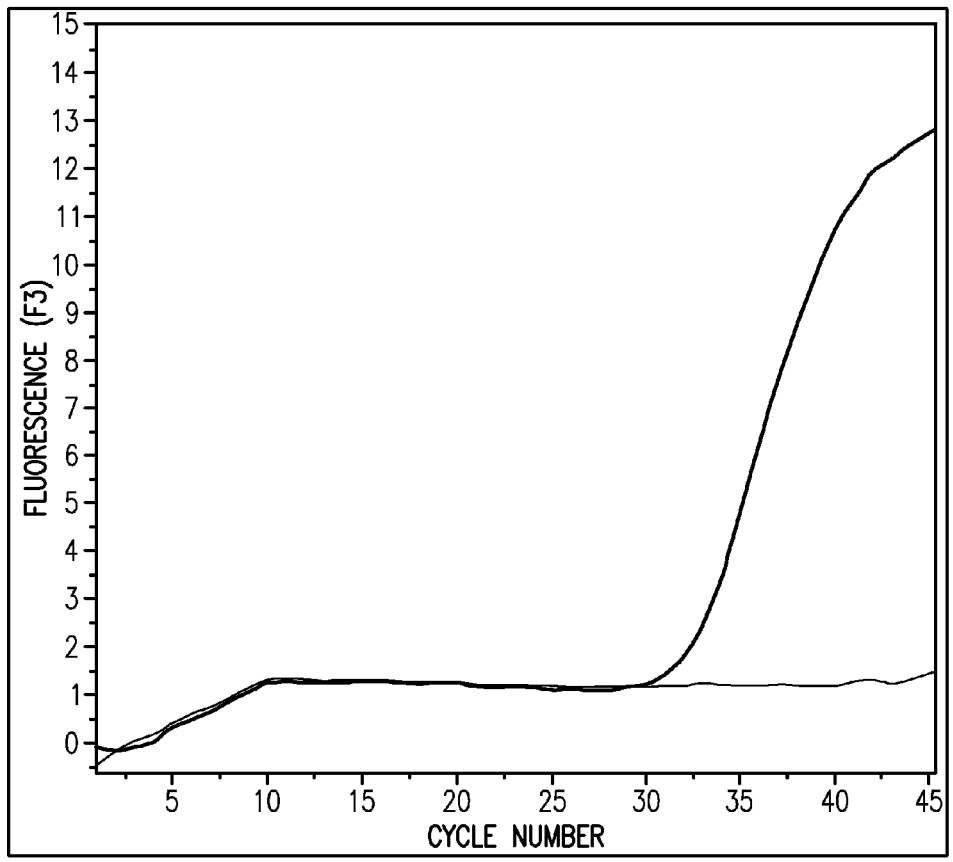
FIG. 4 is a graph showing RT-PCR results of HCV primer modified with Dye 4. Red line is for negative control and green line for Dye 4 modified HCV primer. The results are obtained by Roche Light Cycler.

RNA was isolated from 400 μA plasma or serum from each sample using a QIAamp MinElute Virus Spin Kit in a QIAcube system (QIAGEN, Valencia Calif.) according to the manufacturer's protocol. The resulting RNA was eluted in 50 μl elution buffer. Five μl of the eluate was subjected to RT-PCR to amplify a selected HCV target sequence at 5'-NTR region. A forward primer, containing an amino modified nucleoside C as the second nucleoside from 3' end, was labeled on the C with Dye 4 as a FRET acceptor; a reverse primer, containing an amino modified T as the third nucleoside from the 5' end, was labeled on the T with fluorescein as a FRET donor. Reverse transcription and PCR amplification was carried out in either a Roche Light Cycler or a Qiagen Rotor-Gene Q RealTime PCR machine. Reverse transcription was performed at 50° C. for 30 min. PCR amplification was conducted at 95° C. for 15 sec to denature and 66° C. for 60 sec for annealing/extension, with a total of 50 or 60 cycles. RealTime RT-PCR progress was monitored through measuring the strength of the Dye 4 signal. When the Roche Light Cycler 1.x system was used, Channel 3 was chosen to measure the Dye 4 signal; when the Qiagen Rotor-gene Q system was used, 470 nm was used for excitation and 712 high pass filter was used to measure the Dye 4 emission. FIG. 4 shows results of these assays.

Example 26

Bioconjugation of Dye 4 to allylamine-dUTP

Dye 4 (12 gmol) was dissolved in amine-free DMF (840 µl), followed by the addition of 2-succinimido-1,1,3,3-tetramethyluronium tetrafluoroborate (14.4 µmol) and diisopropylethylamine (26.4 gmol). The mixture was stirred at room temperature for 60 min, and then added to a solution of allylamine-dUTP (2'-deoxyuridine, 5'-triphosphate, 10 µmol) in 0.1 M sodium borate buffer (840 µL, pH 8.5). The mixture was stirred at room temperature for 16 h. Pure product (3.8 gmol, 38% yield) was obtained by ion exchange chromatography. The structure of the allylamine-dUTP and Dye 4 conjugate is:

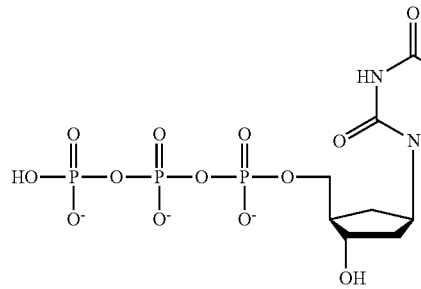
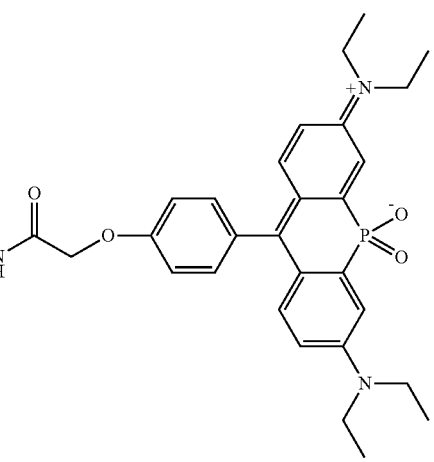

The conjugates of Dye 4 with ATP, GTP, CTP, TTP, UTP, dATP, dGTP, dCTP, dTTP, and dUTP were prepared through similar procedure using respective modified nucleotides containing amino group.

REFERENCES

Agou et al. (2004) Heteroatom Chemistry 15:437-446.
Agou et al. (2004) Chemistry Letters 33:1028-1029.
Bao et al. (2010) Chemical Communications 46:8621-8623.
Bello et al. (2000) Dyes and Pigments 46:121-128.
Bickelhaupt et al. (1976) Tetrahedron 32:1921-1930.
Bychkov et al. (1986) Zhurnal Obshchei Khimii 56:1737-1743.
Bychkov et al. (1984) Zhurnal Obshchei Khimii 54:1995-2000.
Chauzov et al. (1983) Zhurnal Obshchei Khimii 53:364-370.
Chen et al. (1977) Journal of Organic Chemistry 42:1170-1177.
Chen et al. (1985) Journal of Organic Chemistry 50: 2914-2917.
Chen et al. (2002) Journal of Molecular Modeling 8:223-229.
Cornforth et al. (1982) Journal of the Chemical Society, Perkin Transactions 1: Organic and Bio-Organic Chemistry (1972-1999) 10:2299-2315.
Cook et al. (1973) Tetrahedron Letters 7:521-522.
Culcasi et al. (1991) Journal of Organic Chemistry 56:3537-3542.
De Koe et al. (1968) Angewandte Chemie, International Edition in English 7:889-890.
De Koe et al. (1967) Angewandte Chemie 79:533-534.
De Koe et al. (1967) Angewandte Chemie, International Edition in English 6:567-568.
Doak et al. (1964) Journal of Organic Chemistry 29:2382-2385.
Ealick et al. (1979) Acta Crystallographica, Section B: Structural Crystallography and Crystal Chemistry B35:1107-1111.
Egawa et al. (2011) J. Am. Chem. Soc. 133: 14157-14159.
Ernst et al. (1989) Cytometry 10:3-10.
Freijee et al. (1980) Acta Crystallographica, Section B: Structural Crystallography and Crystal Chemistry B36:1247-1249.
Furlan et al. (2006) Thin Solid Films 515:1028-1032.
Granoth et al. (1978) Journal of the Chemical Society, Perkin Transactions 1: Organic and Bio-Organic Chemistry (1972-1999) 5:465-468.
Gray et al. (1996) Angewandte Chemie, International Edition in English 35:1558-1560.
Haake et al. (1969) Journal of Organic Chemistry 34:788-794.
Haake et al. (1968) Tetrahedron Letters 50:5247-5250.
Hasegawa et al. (2004) Carbon 42:2195-2200.
Hatakeyama et al. (2011) Organic Letters 13:2130-2133.
Hellwinkel et al. (1990) Angewandte Chemie 102: 677-680.
Ivanov et al. (1981) Zhurnal Obshchei Khimii 51:1533-1538.
Jongsma et al. (1976) Tetrahedron 32:121-124.
Jongsma et al. (1975) Tetrahedron 31:2931-2935.
Jongsma et al. (1975) Organic Mass Spectrometry 10:515-521.
Jongsma et al. (1974) Tetrahedron 30:3465-3469.
Jongsma et al. (1974) Tetrahedron Letters 14:1267-1270.
Jongsma et al. (1976) Tetrahedron Letters 6:481-4.
Kasmai et al. (1987) Journal of Organic Chemistry 52: 5461-5466.
Kobayashi et al. (2004) Phosphorus, Sulfur and Silicon and the Related Elements 179:959-960.
Kobayashi et al. (2003) Chemistry Letters 32:1144-1145.
Koide et al. (2011) ACS Chem. Biol. 6 (6): 600-608.

Koide et al. (2012) J. Am. Chem. Soc. 134: 5039-5031.
Li et al. (2006) Tetrahedron 62:4453-4462.
Maerkl et al. (1974) Tetrahedron Letters 49/50:4369-4372.
McCann et al. (2011) Bioconjugate Chemistry 22: 2531-2538.
Mujumdar et al. (1989) Cytometry 10:11-19.
Mujumdar et al. (1993) Bioconjugate Chemistry 4:105-111.
Negrebetskii et al. (1984) Zhurnal Obshchei Khimii 54: 2649-2650.
Negrebetskii et al. (1982) Zhurnal Obshchei Khimii 52:1930-1931.
Nieto et al. (2008) Organometallics 27:3608-3610.
Pervukhina et al. (1990) Zhurnal Obshchei Khimii 60:1558-1566.
Petrov et al. (1981) Zhurnal Obshchei Khimii 51: 2142.
Petrov et al. (1978) Zhurnal Obshchei Khimii 48:1187.
Petrov et al. (1977) Zhurnal Obshchei Khimii 47: 2516-2522.
Redouane et al. (1993) Phosphorus, Sulfur and Silicon and the Related Elements 77:101-104.
Schaefer et al. (1972) Angewandte Chemie, International Edition in English 11:924-925.
Segall et al. (1977) Journal of Chemical Research, Synopses 12:310-311.
Segall et al. (1974) Journal of the Chemical Society, Chemical Communications 13:501-502.
Shi et al. (2009) Journal of Molecular Structure: THEOCHEM 902: 66-71.
Skvortsov et al. (1991) Zhurnal Obshchei Khimii 61: 2194-2198.
Southwick et al. (1990) Cytometry 11:418-430.
Turker (2003) Journal of Molecular Structure: THEOCHEM 638:63-67.
Vande et al. (1976) Phosphorus and the Related Group V Elements 6:131-133.
Van der Putten et al. (1980) Acta Crystallographica, Section B: Structural Crystallography and Crystal Chemistry B36: 1250-1252.
van der Veen et al. (1999) Organometallics 18:4765-4777.
Widhalm et al. (2003) Bulletin of the Chemical Society of Japan 76:1233-1244.
Wu et al. (1977) Crystal Structure Communications 6:405-412.
Xu et al. (2009) Gaodeng Xuexiao Huaxue Xuebao 30:1219-1226.
Zhu et al. (1994) Nucl. Acid Res. 22:3418-3422. Chinese patent CN100361999.
European Patent Publication 0 070 685.
European Patent Publication 0 231 495.
European Patent Publication 0 543 333.
European Patent Publication 0 567 622.
European Patent Publication 0 971 039.
European Patent Publication 2 145 936.
German Patent Publication DE19523335.
Japanese Patent Publication JP05238138.
Japanese Patent Publication JP06100577.
PCT Publication WO 1999/047700.
PCT Publication WO 1999/028500.
PCT Publication WO 2000/064986.
PCT Publication WO 2003/007296.
PCT Publication WO 2005/003086.
PCT Publication WO 2005/017065.
PCT Publication WO 2005/042562.
PCT Publication WO 2010/104047.
PCT Publication WO 2010/126077.
U.S. Pat. No. 4,683,202.
U.S. Pat. No. 4,707,440.
U.S. Pat. No. 4,711,955.
U.S. Pat. No. 4,868,103.
U.S. Pat. No. 4,952,685.
U.S. Pat. No. 5,013,831.
U.S. Pat. No. 5,047,519.
U.S. Pat. No. 5,118,801.
U.S. Pat. No. 5,130,238.
U.S. Pat. No. 5,210,015.
U.S. Pat. No. 5,237,515.
U.S. Pat. No. 5,241,060.
U.S. Pat. No. 5,268,486.
U.S. Pat. No. 5,270,184.
U.S. Pat. No. 5,401,847.
U.S. Pat. No. 5,436,134.
U.S. Pat. No. 5,455,166.
U.S. Pat. No. 5,455,175.
U.S. Pat. No. 5,494,810.
U.S. Pat. No. 5,538,848.
U.S. Pat. No. 5,569,766.
U.S. Pat. No. 5,580,990.
U.S. Pat. No. 5,627,027.
U.S. Pat. No. 6,348,596.
U.S. Pat. No. 5,646,264.
U.S. Pat. No. 5,658,751.
U.S. Pat. No. 5,696,157.
U.S. Pat. No. 5,800,996.
U.S. Pat. No. 5,830,912.
U.S. Pat. No. 5,866,336.
U.S. Pat. No. 5,925,517.
U.S. Pat. No. 5,948,648.
U.S. Pat. No. 5,994,056.
U.S. Pat. No. 6,004,286.
U.S. Pat. No. 6,008,373.
U.S. Pat. No. 6,110,630.
U.S. Pat. No. 6,114,350.
U.S. Pat. No. 6,117,635.
U.S. Pat. No. 6,130,101.
U.S. Pat. No. 6,174,670.
U.S. Pat. No. 6,184,379.
U.S. Pat. No. 6,323,337.
U.S. Pat. No. 6,448,008.
U.S. Pat. No. 6,552,199.
U.S. Pat. No. 6,593,465.
U.S. Pat. No. 6,743,605.
U.S. Pat. No. 6,828,159.
U.S. Pat. No. 7,166,478.
U.S. Pat. No. 7,569,695.
U.S. Patent Publication 2003/0225247.
U.S. Patent Publication 2005/0137388.
U.S. Patent Publication 2005/0176014.
U.S. Patent Publication 2005/0042618.
U.S. Patent Application 2011/0190486.

In view of the above, it will be seen that several objectives of the invention are achieved and other advantages attained.

As various changes could be made in the above methods and compositions without departing from the scope of the invention, it is intended that all matter contained in the above description and shown in the accompanying drawings shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

What is claimed is:

1. A fluorescent dye comprising Structure I, II, III or IV:

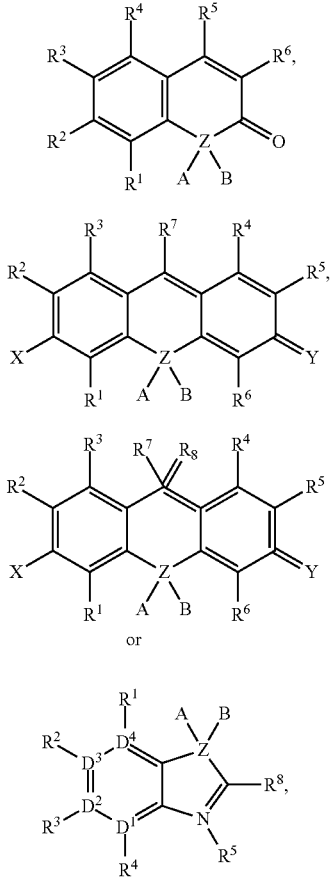

wherein $R^1$, $R^2$, $R^3$, $R^4$, $R^5$, $R^6$, $R^7$ and $R^8$ are independently H, F, Cl, Br, I, CN, nitro, azido, hydroxyl, amino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl(aryl)aminocarbonyl, arylcarboxamido, or Q, the alkyl or alkoxy portions of which are saturated or unsaturated, linear or branched, and unsubstituted or substituted; wherein Q comprises a carboxyl group ($CO_2^-$), a carbonyl halide, a carbonate ester or thioester ($COSR^9$) or amide ($COER^9$), a thiocarboxylic acid, a thiocarbonyl halide, a thiocarbonate ester or amide ($CSER^9$), a sulfonate acid or halide or ester ($SO_2ER^9$), a sulfoxide ($SOR^9$), a sulfone ($SO_2CR^9R^{10}R^{11}$), a sulfonamide ($SO_2NR^9R^{10}$), a phosphate ($PO_4^=$), a phosphoryl halide, a phosphate monoester or monoamide ($PO_3^-ER^9$), a phosphate diester or diamide ($PO_2ER^9ER^{10}$), a phosphonate ($PO_3^=$), a phosphonyl halide, a phosphonate monoester or monoamide ($PO_2^-ER^9$), a phosphonate diester or diamide ($POER^9ER^{10}$), a thiophosphate ($PSO_3^=$), a thiophosphate monoester or monoamide ($PSO_2^-ER^9$), a thiophosphate diester or diamide ($PSOER^9ER^{10}$), a thiophosphonate ($PSO_2^=$), a thiophosphonyl halide, a thiophosphonate monoester or monoamide ($PSO^-ER^9$), a thiophosphonate diester or diamide ($PSER^9ER^{10}$), a phosphonamide ($PONR^9R^{10}NR^{12}R^{13}$), a phosphonamide thioanalogue ($PSNR^9R^{10}NR^{12}R^{13}$), a phosphoramide ($PONR^9R^{10}NR^{11}NR^{12}R^{13}$), a phosphoramide thioanalogue ($PSNR^9R^{10}NR^{11}NR^{12}R^{13}$), a phosphoramidite ($PO_2R^{12}NR^9R^{10}$) or a phosphoramidite thioanalogue ($POSR^{12}NR^9R^{10}$), where each E is independently N, NH, O or S;

$R^1$ in combination with $R^2$, $R^2$ in combination with $R^3$, $R^3$ in combination with $R^4$, $R^3$ in combination with $R^7$, $R^4$ in combination with $R^7$, or $R^4$ in combination with $R^5$ can independently form a 5-10 member ring structure which is saturated, unsaturated or aromatic, unsubstituted or comprising a heteroatom, and/or further substituted;

$R^9$, $R^{10}$, $R^{11}$, $R^{12}$ and $R^{13}$ are independently a hydrogen, a halogen, an amino group, an alkyl group wherein said alkyl group is saturated or unsaturated, linear or branched, or substituted or unsubstituted, an alkoxy group wherein said alkoxy group is saturated or unsaturated, branched or linear, or substituted or unsubstituted, an aryl group wherein said aryl group is unsubstituted or substituted; wherein $R^9$ in combination with $R^{10}$, $R^{12}$ in combination with $R^{13}$, $R^9$ in combination with $R^{11}$, $R^9$ in combination with $R^{12}$, $R^{10}$ in combination with $R^{13}$, or $R^{11}$ in combination with $R^{12}$ can independently form a 5-10 member ring;

X is O, $OR^{14}$, S, $SR^{15}$, $CR^{16}R^{17}$, $NR^{16}R^{17}$ or $N^+R^{16}R^{17}$; Y is O, $OR^{14}$, S, $SR^{15}$, $CR^{18}R^{19}$, $NR^{18}R^{19}$ or $N^+R^{18}R^{19}$, wherein $R^{14}$, $R^{15}$, $R^{16}$, $R^{17}$, $R^{18}$ and $R^{19}$ are independently H, alkyl, aryl, alkylcarbonyl, arylcarbonyl, or Q, in which the alkyl or aryl potions are unsubstituted or substituted, saturated or unsaturated, or $R^{16}$ in combination with $R^{17}$, or $R^{18}$ in combination with $R^{19}$ can independently form an unsubstituted or substituted 5-10 member ring structure, and $R^{16}$ in combination with $R^1$, $R^{17}$ in combination with $R^2$, $R^{18}$ in combination with $R^5$, or $R^{19}$ in combination with $R^6$, can independently form a 5- to 10-member ring structure that is saturated or unsaturated and substituted or unsubstituted;

Z is a pentavalent P or As;

A and B are substituents that link to Z through single or double bonds and are independently H, O, S, NH, F, Cl, Br, I, CN, nitro, azido, hydroxyl, amino, imino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl(aryl)aminocarbonyl, arylcarboxamido, or Q, the alkyl or alkoxy portions of which are saturated or unsaturated, linear or branched, and substituted or unsubstituted;

A in combination with B, A in combination with a ring formed by $R^1$ and $R^2$, B in combination with a ring formed by $R^4$ and $R^5$ of structures I or II, A in combination with $R^1$, B in combination with $R^6$, A in combination with $R^6$, or B in combination with $R^7$, can independently form a 5- to 10-member ring structure that is saturated or unsaturated, and unsubstituted or substituted; and $D^1$, $D^2$, $D^3$ and $D^4$ are either C or N, wherein only 1 or none of $D^1$, $D^2$, $D^3$ or $D^4$ are N.

2. The fluorescent dye of claim 1, wherein at least one of $R^1$, $R^2$, $R^3$, $R^4$, $R^5$, $R^6$, $R^7$ and $R^8$ comprises an alkyl, alkoxy and/or aryl that is further substituted by F, Cl, Br, I, CN, OH, alkenyl, alkynyl, alkylcarbonyl, amide, or thioamide; and/or at least one of $R^1$, $R^2$, $R^3$, $R^4$, $R^5$, $R^6$, $R^7$ and $R^8$ comprises an alkyl and/or alkoxy that is further substituted by Q; and/or at least one of $R^1$ in combination with $R^2$, $R^2$ in combination with $R^3$, $R^3$ in combination with $R^4$, $R^3$ in combination with $R^7$, $R^4$ in combination with $R^7$, or $R^4$ in combination with $R^5$ independently forms a 5-10 member ring structure that is further substituted with an alkyl, an aryl, an alkenyl, an alkynyl, an alkoxy, an aroxyl, a hydroxyl, an F, a Cl, a Br, an I, a CN, a nitro, an alkylsulfonyl, an arylsulfonyl, an alkylsulfinyl, an arylsulfinyl, a (thio)carbonyl, a (thio)carboxylic acid, a (thio)carboxylic acid ester, a nitro, an amino, a (thio)amide, an azido, a hydrazino, or a (thio)phosphonate where each alkyl group or alkoxy group is independently saturated or unsaturated, linear or branched, or substituted or unsubstituted, and each aryl group is unsubstituted or substituted and/or at least one of A or B is an alkyl or alkoxy that is further substituted by F, Cl, Br, I, CN, OH, alkenyl, alkynyl, alkylcarbonyl, amide, thioamide, or Q; and/or at least one of A in combination with B, A in combination with a ring formed by $R^1$ and $R^2$, B in combination with a ring formed by $R^4$ and $R^5$, A in combination with $R^1$, B in combination with $R^6$, A in combination with $R^6$, or B in combination with $R^7$, independently form a 5- to 10-member ring structure that is substituted with an alkyl, an aryl, an alkenyl, an alkynyl, an alkoxy, an aroxyl, a hydroxyl, an F, a Cl, a Br, an I, a CN, a nitro, a carbonyl, a thiocarbonyl, a thiocarboxylic acid, a thiocarboxylic acid ester, a nitro, an amino, a (thio)amide, an azido, a hydrazino, or Q, wherein the alkyl group herein is saturated or unsaturated, linear or branched, substituted or unsubstituted, an alkoxy group wherein the alkoxy group is saturated or unsaturated, branched or linear, substituted or unsubstituted.

3. The fluorescent dye of claim 2, wherein
at least one of the 5-10 member ring structure formed by $R^1$ in combination with $R^2$, $R^2$ in combination with $R^3$, $R^3$ in combination with $R^4$, or $R^4$ in combination with $R^5$ is substituted with an aryl substituted with an F, a Cl, a Br, an I, a CN, an OH, an alkyl, an alkenyl, an alkynyl, an alkoxy, an aryoxy, an alkylthio, an arylthio, a nitro, an azido, a hydrazino, a carboxyl, a thiocarboxyl, a carbonyl, a thiocarbonyl, a carboxylic acid ester, a thiocarboxylic acid ester, or an unsubstituted or substituted amino, amide, thioamide, or Q.

4. The fluorescent dye of claim 1, wherein Z is P, A is =O and B is —OH or —O⁻.

5. The fluorescent dye of claim 1, comprising structure II or III and further comprising the 5-10 member ring structure independently formed by $R^{16}$ in combination with $R^{17}$, and/or $R^{18}$ in combination with $R^{19}$, further substituted with alkyl, alkenyl, alkynyl, aryl, alkoxy, F, Cl, Br, I, carboxylic acid or carboxylic acid ester, where the alkyl group is saturated or unsaturated, linear or branched, and substituted or unsubstituted.

6. The fluorescent dye of claim 5, wherein the 5-10 member ring structure independently formed by $R^{16}$ in combination with $R^{17}$, and/or $R^{18}$ in combination with $R^{19}$ comprises
an alkyl group that is further substituted by F, Cl, Br, I, CN, OH, alkenyl, alkynyl, nitro, azido, hydrazino, alkoxy, aryoxy, alkylthio, arylthio, thiocarboxyl, carbonyl, thiocarbonyl, thiocarboxylic acid ester, unsubstituted or substituted amino, amide, thioamide, or Q, and/or
an aryl group that is further substituted by F, Cl, Br, I, CN, OH, alkoxy, aryoxy, alkylthio, arylthio, nitro, azido, hydrazino, carboxyl, thiocarboxyl, carbonyl, thiocarbonyl, carboxylic acid ester, thiocarboxylic acid ester, unsubstituted or substituted amino, amide, thioamide, or Q.

7. The fluorescent dye of claim 1, comprising

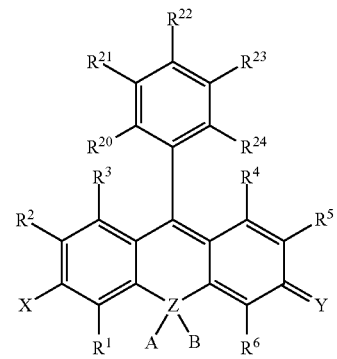

wherein
$R^{20}$, $R^{21}$, $R^{22}$, $R^{23}$ and $R^{24}$ are independently H, F, Cl, Br, I, CN, nitro, azido, hydroxyl, amino, hydrazino, (substituted) aryl, (substituted) aroxyl, alkenyl, alkynyl, alkyl, alkoxy, alkylamino, dialkylamino, arylamino, diarylamino, alkyl(aryl)amino, alkanoylamino, alkylthio, alkylcarbonyl, aryl carbonyl, alkylthiocarbonyl, arylthiocarbonyl, alkyloxycarbonyl, aroxycarbonyl, alkylaminocarbonyl, arylaminocarbonyl, dialkylaminocarbonyl, diarylaminocarbonyl, alkyl(aryl)aminocarbonyl, arylcarboxamido, or Q, the alkyl or alkoxy portions of which are saturated or unsaturated, linear or branched, and substituted or unsubstituted.

8. The fluorescent dye of claim 7, wherein at least one of $R^{20}$, $R^{21}$, $R^{22}$, $R^{23}$ and $R^{24}$ is independently alkyl or alkoxy further substituted by F, Cl, Br, I, CN, OH, alkenyl, alkynyl, alkylcarbonyl, amide, thioamide, or Q.

9. The fluorescent dye of claim 7, wherein either $R^{22}$ or $R^{24}$ is —COOH, —O(CH$_2$)$_n$COOH or SO$_3$H, wherein n=1-10.

10. The fluorescent dye of claim 1, comprising

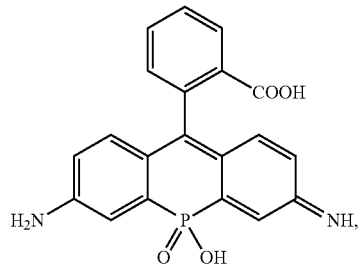

-continued
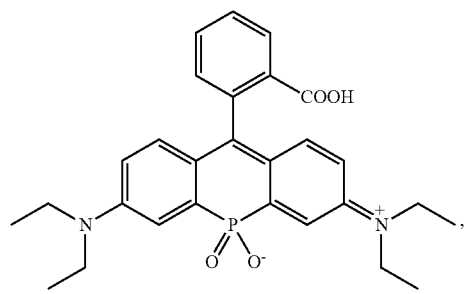
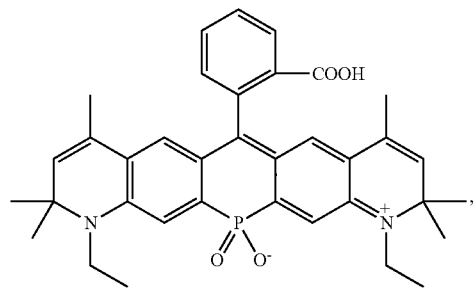
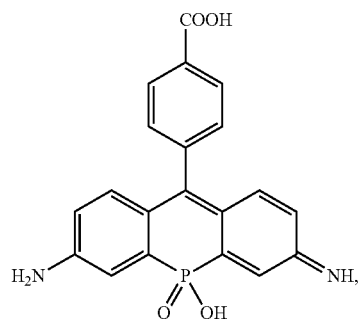
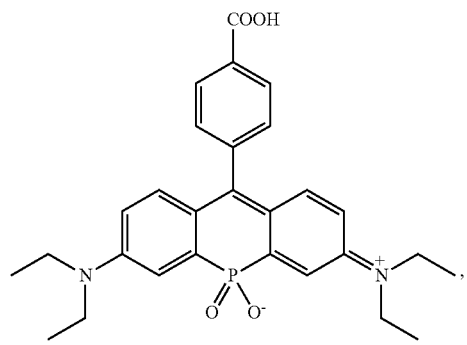
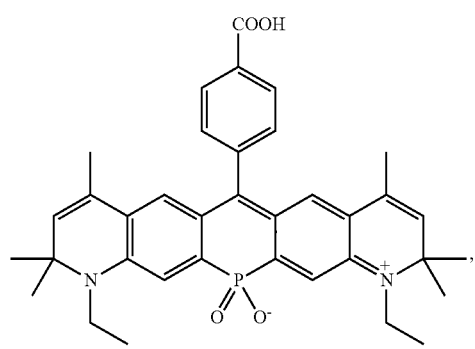

-continued
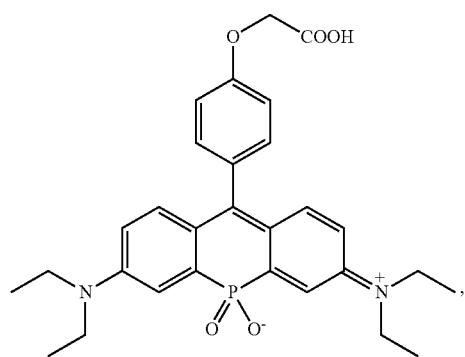
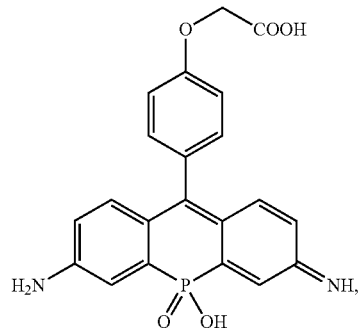
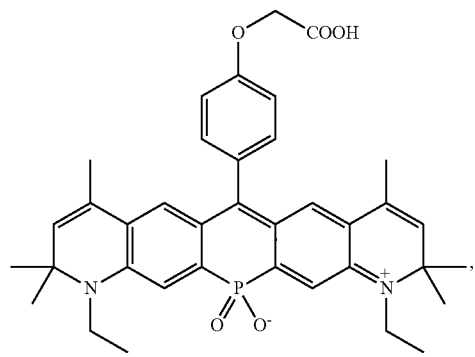
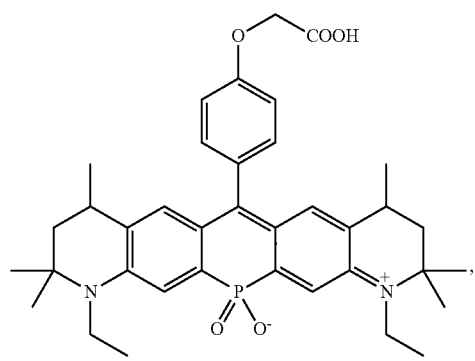
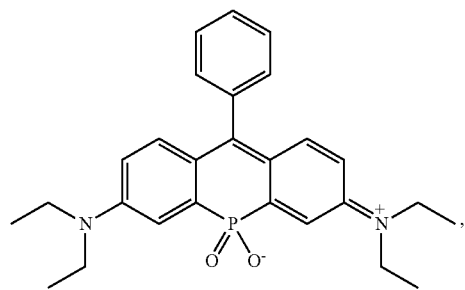

-continued
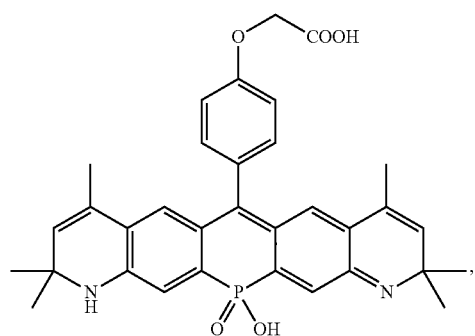
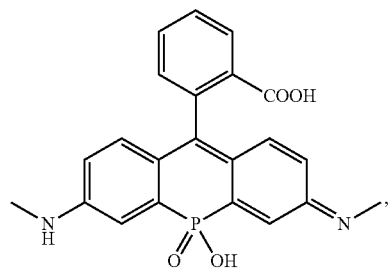
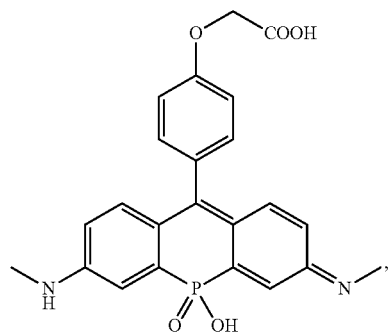
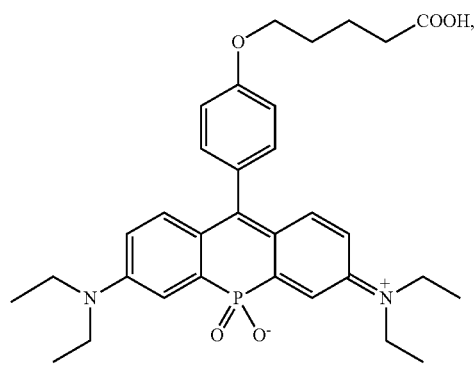
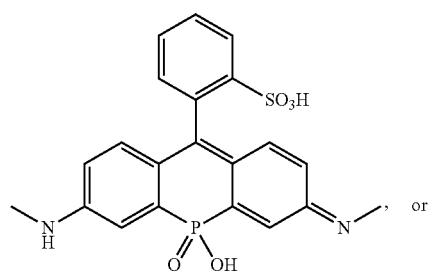

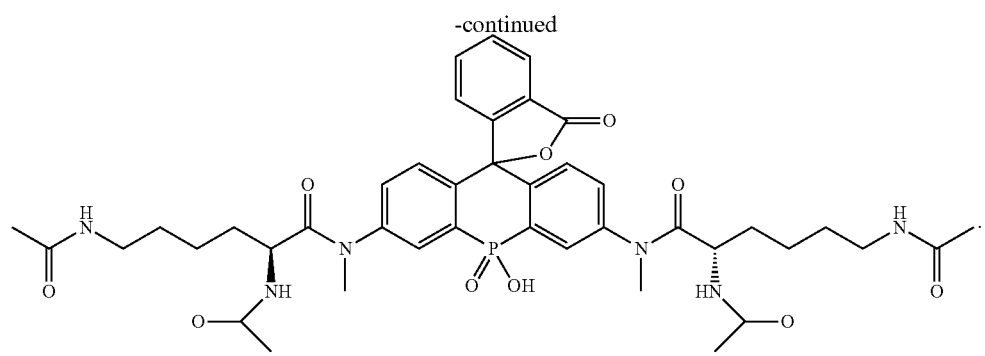
11. The fluorescent dye of claim 1, further comprising a reactive group L.
12. The fluorescent dye of claim 11, comprising
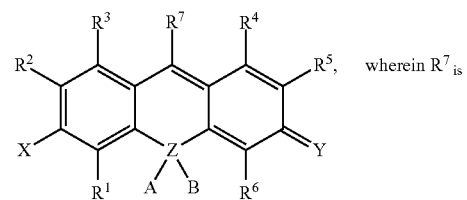 wherein $R^7$ is
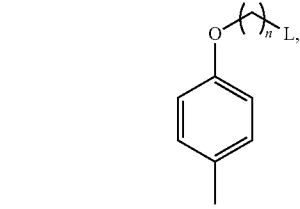
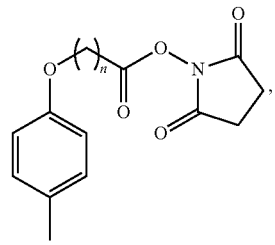
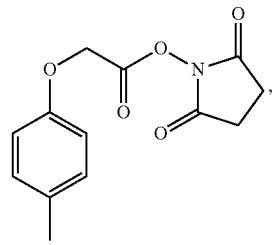
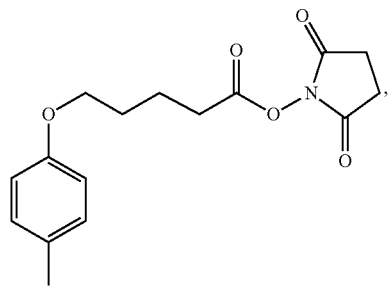
-continued
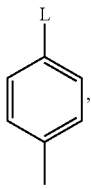
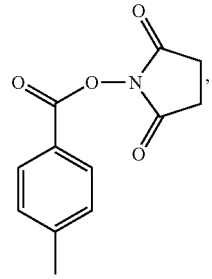
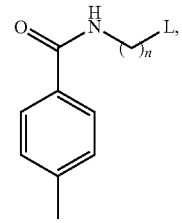
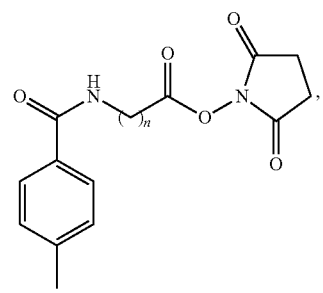
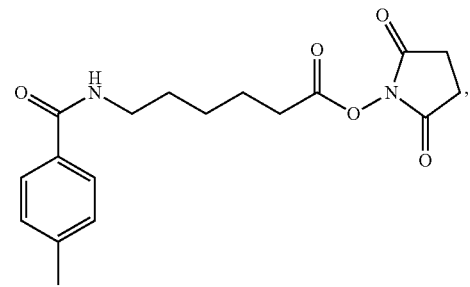

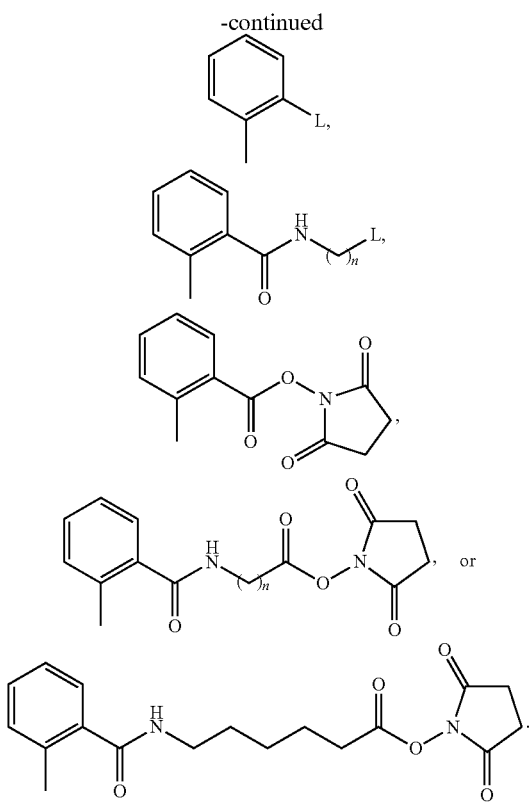
13. The fluorescent dye of claim 11, comprising
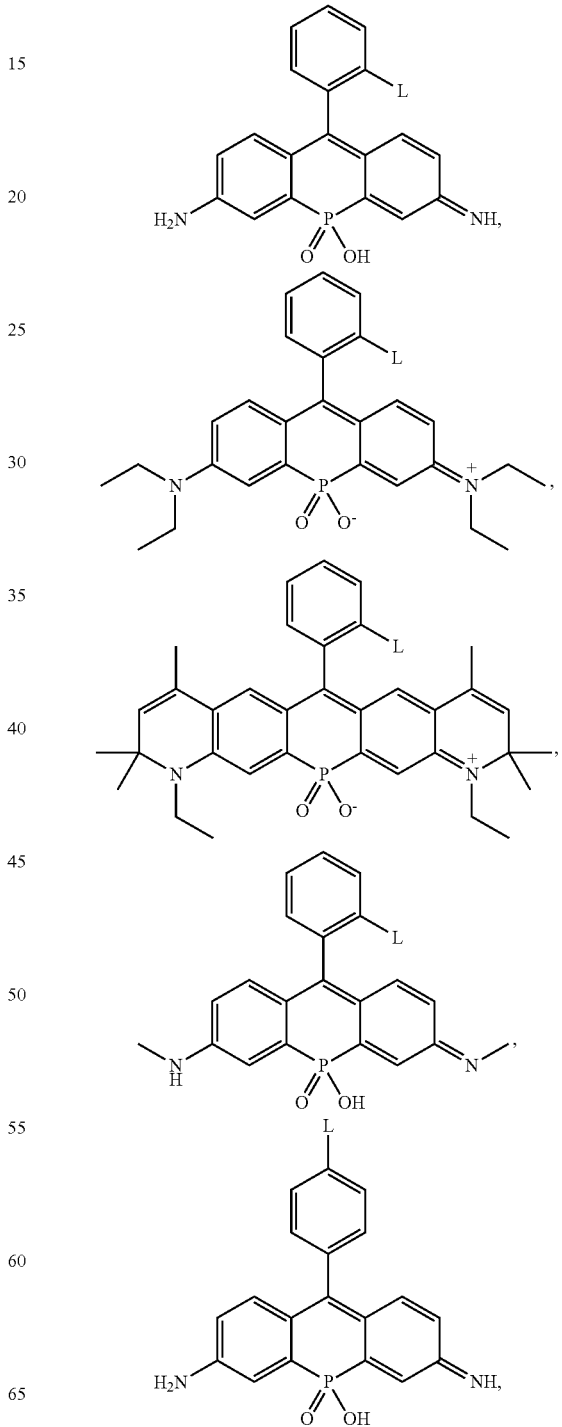
wherein X and Y are
(a) NH$_2$ and NH, respectively;
(b) —NHCH$_2$CH$_3$ and —NCH$_2$CH$_3$, respectively;
(c) —NHCH$_3$ and —NCH$_3$, respectively;
(d) —N(CH$_2$CH$_3$)$_2$ and —N$^+$(CH$_2$CH$_3$)$_2$, respectively; or
(e) a tertiary amine and a quaternary ammonium in a ring system, respectively.
14. The fluorescent dye of claim 11, comprising

59
-continued
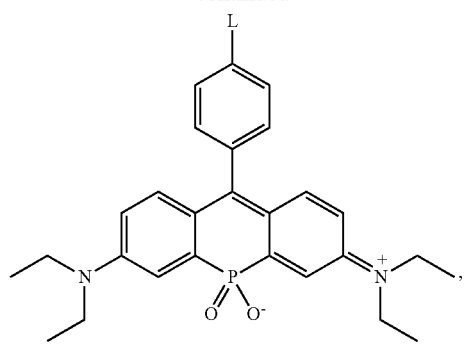
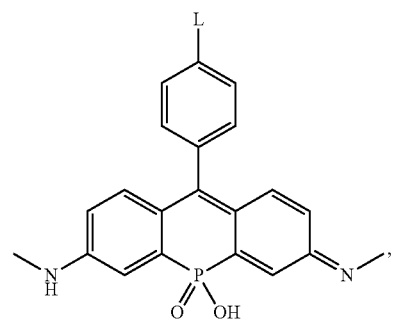
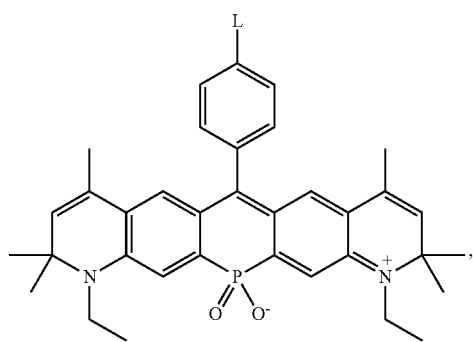
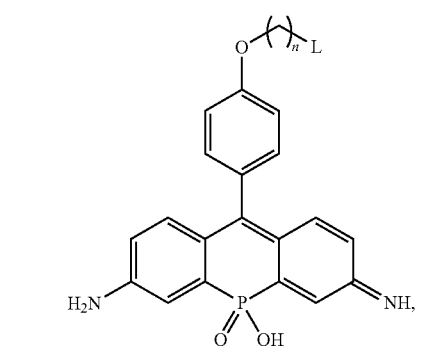
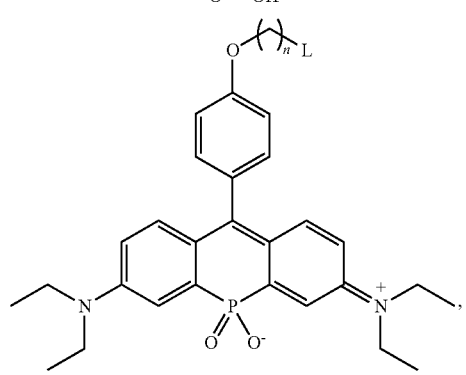
60
-continued
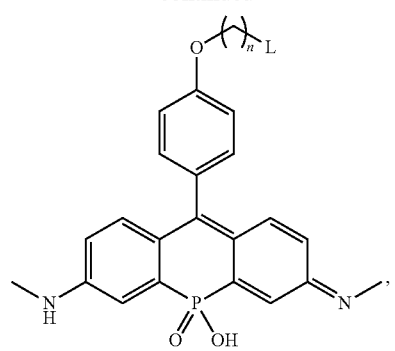
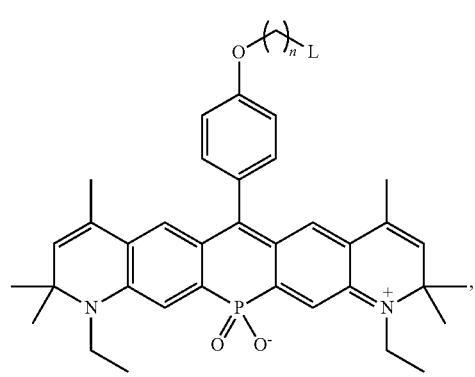
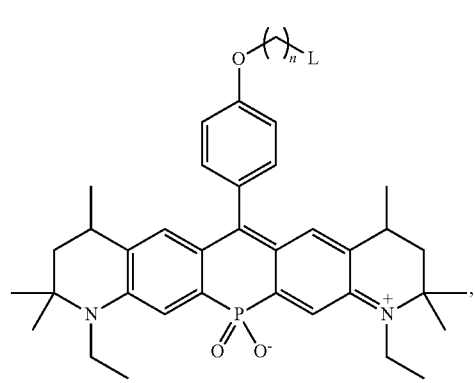
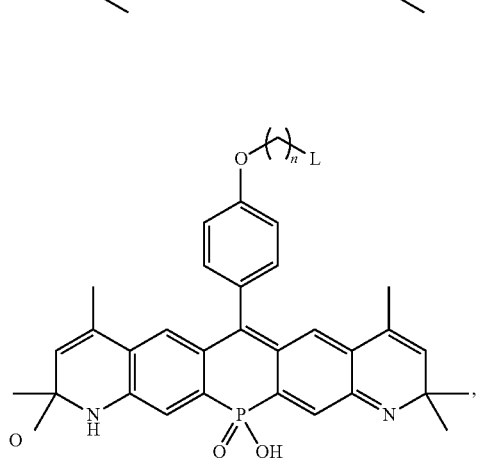

61
-continued
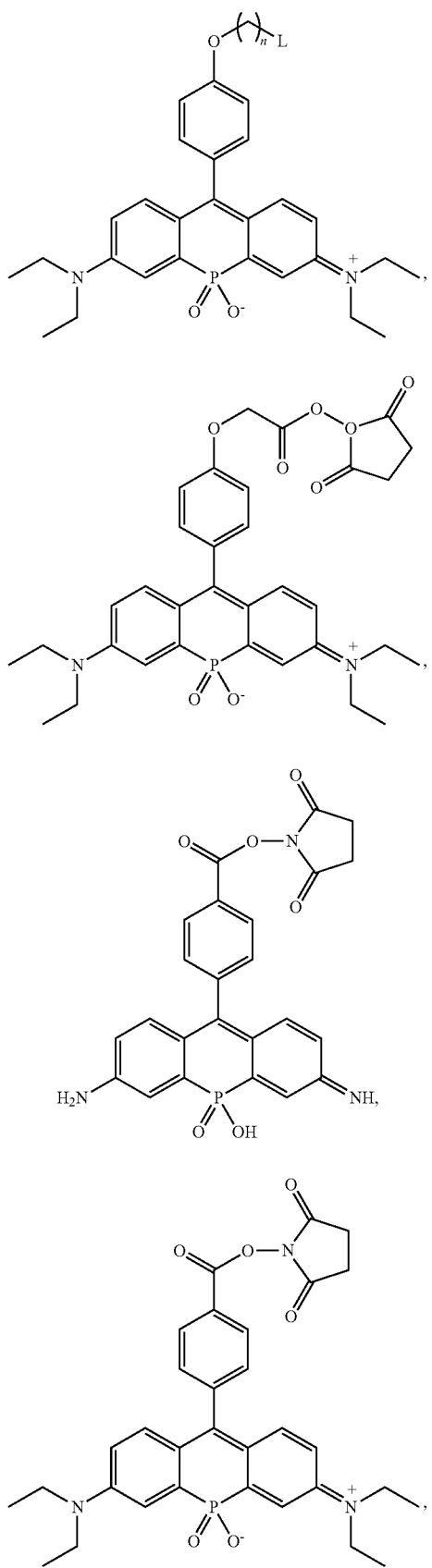
62
-continued
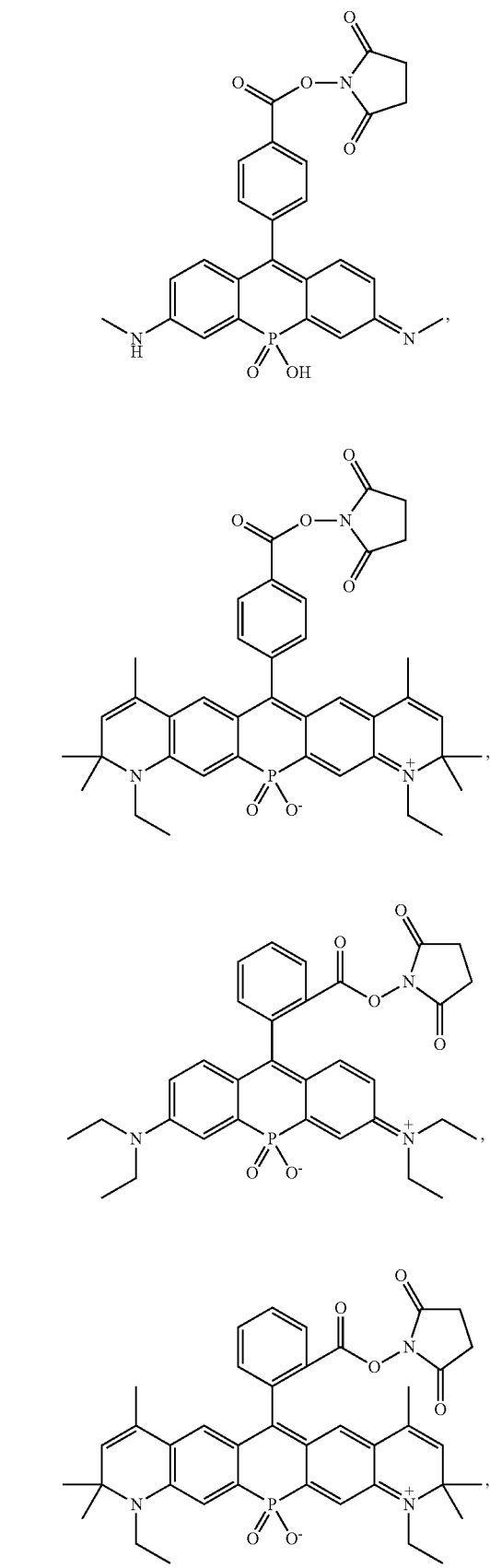

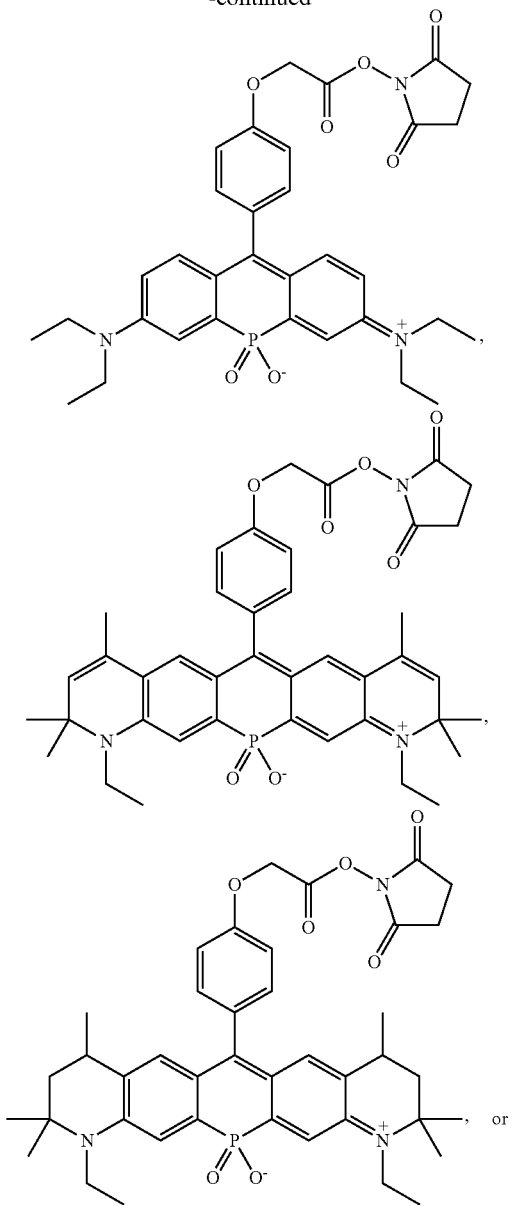
, or

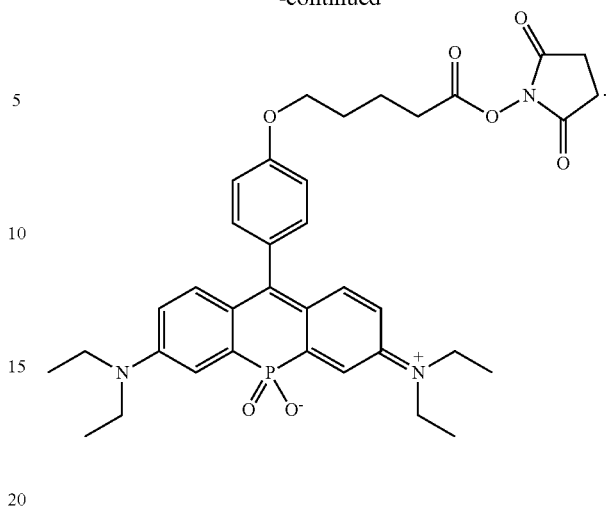

15. The fluorescent dye of claim 1, further comprising a member of a binding pair.

16. A fluorescence energy transfer system, comprising the fluorescent dye of claim 1 and a second dye wherein the second dye is capable of energy transfer with the fluorescent dye.

17. The fluorescent dye of claim 1, bound to a target molecule.

18. A target molecule labeled with the fluorescent dye of claim 1.

19. A method of labeling a target molecule, the method comprising contacting reactive group L of the fluorescent dye of claim 11 with the target molecule such that reactive group L reacts with the target molecule to form a covalent bond between reactive group L and the target molecule.

20. A method of labeling a target molecule, the method comprising contacting the fluorescent dye of claim 15 with the target molecule, wherein the target molecule comprises a second member of the binding pair.

* * * * *

UNITED STATES PATENT AND TRADEMARK OFFICE
CERTIFICATE OF CORRECTION

| | | |
|---|---|---|
| PATENT NO. | : 8,506,655 B1 | Page 1 of 1 |
| APPLICATION NO. | : 13/565323 | |
| DATED | : August 13, 2013 | |
| INVENTOR(S) | : Li et al. | |

It is certified that error appears in the above-identified patent and that said Letters Patent is hereby corrected as shown below:

In the Specification:

At column 12, line 20 delete

" 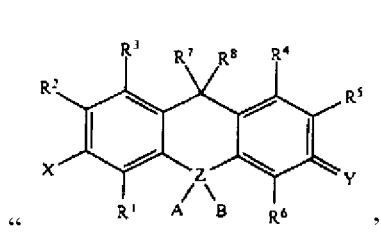 " and insert -- 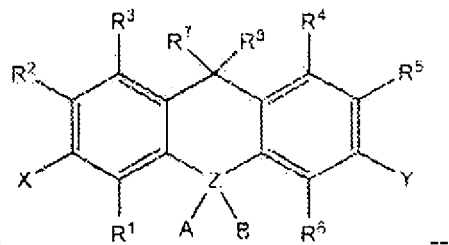 --

In the Claims:

At column 45, line 25 delete

" 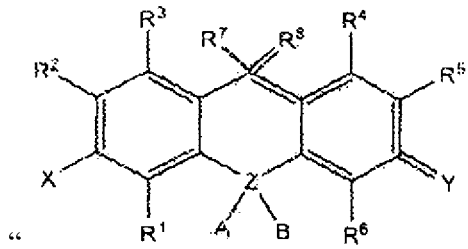 " and insert -- 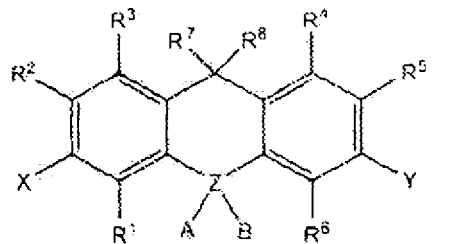 --

Signed and Sealed this
Seventeenth Day of September, 2013

Teresa Stanek Rea
*Deputy Director of the UnitedStates Patent and Trademark Office*